US011904323B2

(12) United States Patent
Johnson et al.

(10) Patent No.: US 11,904,323 B2
(45) Date of Patent: Feb. 20, 2024

(54) VISCOUS FOOD PRODUCT GRINDING AND DISPENSING SYSTEM

(71) Applicant: Trade Fixtures, LLC, Little Rock, AR (US)

(72) Inventors: Scott Johnson, Little Rock, AR (US); Shaji Kulangara Veettil, Little Rock, AR (US); John Calow, North Little Rock, AR (US); Vaishakh Rajan, Bangalore (IN); Ronald Brundick, Roland, AR (US); Pranav Bhat, Bangalore (IN)

(73) Assignee: Trade Fixtures, LLC, Little Rock, AR (US)

( * ) Notice: Subject to any disclaimer, the term of this patent is extended or adjusted under 35 U.S.C. 154(b) by 573 days.

(21) Appl. No.: 17/089,084

(22) Filed: Nov. 4, 2020

(65) Prior Publication Data
US 2021/0046485 A1    Feb. 18, 2021

Related U.S. Application Data

(63) Continuation of application No. 15/459,793, filed on Mar. 15, 2017, now Pat. No. 10,843,203, which is a
(Continued)

(30) Foreign Application Priority Data

Mar. 17, 2016   (IN) .............................. 201611009273

(51) Int. Cl.
*B02C 18/30*  (2006.01)
*B02C 19/22*  (2006.01)
(Continued)

(52) U.S. Cl.
CPC .............. *B02C 19/22* (2013.01); *A23N 15/00* (2013.01); *B02C 7/06* (2013.01); *B02C 7/175* (2013.01);
(Continued)

(58) Field of Classification Search
CPC .... B02C 18/2258; B02C 18/30; B02C 18/301
See application file for complete search history.

(56) References Cited

U.S. PATENT DOCUMENTS 1,394,082 A    10/1921   Greene
2,106,711 A *  2/1938    Berkman ................ B02C 18/30
                                                      241/86
(Continued)

FOREIGN PATENT DOCUMENTS

EM   003381557-0001   9/2016
EM   003381557-0002   9/2016
WO   2001097663       12/2001

OTHER PUBLICATIONS

International Search Report for PCT Application No. PCT/US2017/022960, dated Jun. 1, 2017.
(Continued)

*Primary Examiner* — Faye Francis
(74) *Attorney, Agent, or Firm* — Andrus Intellectual Property Law, LLP

(57) ABSTRACT

A viscous food product dispensing system having a transport section for receiving a particulate food product from a bin, an auger for processing and conveying the received particulate food product from the transport section into an outlet adapter via one or more flutes, a milling device housed in the outlet adapter, and a discharge nozzle in the outlet adapter that pinches off the viscous food product created by the milling device. The auger has a unique design that allows it to engage and break whole nuts.

19 Claims, 38 Drawing Sheets

Related U.S. Application Data continuation-in-part of application No. 29/577,721, filed on Sep. 15, 2016, now Pat. No. Des. 810,565.

(60) Provisional application No. 62/453,759, filed on Feb. 2, 2017, provisional application No. 62/431,222, filed on Dec. 7, 2016.

(51) Int. Cl.
| | |
|---|---|
| *B65D 83/06* | (2006.01) |
| *A23N 15/00* | (2006.01) |
| *B65D 47/08* | (2006.01) |
| *B02C 23/02* | (2006.01) |
| *B02C 7/06* | (2006.01) |
| *B02C 7/175* | (2006.01) |
| *B02C 18/14* | (2006.01) |
| *F16K 15/14* | (2006.01) |
| *B02C 18/22* | (2006.01) |

(52) U.S. Cl.
CPC ............ *B02C 18/14* (2013.01); *B02C 18/143* (2013.01); *B02C 18/2258* (2013.01); *B02C 18/30* (2013.01); *B02C 18/301* (2013.01); *B02C 23/02* (2013.01); *B65D 47/0823* (2013.01); *B65D 83/06* (2013.01); *F16K 15/147* (2013.01)

(56) References Cited

U.S. PATENT DOCUMENTS

| | | | |
|---|---|---|---|
| 2,282,521 A * | 5/1942 | Kaptuller | B02C 18/30 241/82.6 |
| D136,098 S | 8/1943 | Hartman, Sr. | |
| 2,531,158 A * | 11/1950 | Robinson | B02C 18/30 74/425 |
| 2,550,132 A | 4/1951 | Woods | |
| 2,655,967 A * | 10/1953 | Mallory | B02C 18/30 403/18 |
| D179,333 S | 11/1956 | Tupper | |
| 2,816,548 A | 12/1957 | Tupper | |
| 2,875,798 A * | 3/1959 | Hugo | B02C 18/301 241/82.1 |
| 3,014,515 A * | 12/1961 | Meeker | F16P 3/08 241/37.5 |
| 3,429,108 A | 2/1969 | Larson | |
| 3,512,213 A * | 5/1970 | Ingram, Jr. | B02C 18/30 425/461 |
| D219,900 S | 2/1971 | Van Lelyveld | |
| 3,860,182 A * | 1/1975 | Peterson | B02C 18/2258 241/222 |
| 4,027,824 A | 6/1977 | Fuller | |
| 4,085,899 A | 4/1978 | Boothe | |
| 4,201,349 A | 5/1980 | Walsh | |
| 4,202,505 A | 5/1980 | Ruuskanen | |
| 4,285,084 A | 8/1981 | Brady et al. | |
| D264,053 S | 4/1982 | Ma et al. | |
| D272,468 S | 1/1984 | Bulgarelli et al. | |
| 4,426,921 A | 1/1984 | Meinardus | |
| 4,454,967 A | 6/1984 | Carr | |
| 4,566,612 A | 1/1986 | Von Kreuter | |
| D292,672 S | 11/1987 | Duell | |
| 4,749,135 A | 6/1988 | Walsh | |
| D308,886 S | 6/1990 | Aoyama | |
| 5,409,144 A | 4/1995 | Brown | |
| 5,553,792 A | 9/1996 | Romer et al. | |
| 5,558,283 A | 9/1996 | Fisher et al. | |
| 5,707,016 A | 1/1998 | Witsken | |
| D398,813 S | 9/1998 | Franzese | |
| D399,601 S | 10/1998 | Desnos et al. | |
| 5,890,621 A | 4/1999 | Bachman et al. | |
| 5,902,060 A | 5/1999 | Rodriguez | |
| 6,305,584 B1 | 10/2001 | Dobobrov et al. | |
| 6,357,682 B1 * | 3/2002 | Hext | B02C 18/145 241/161 |
| D521,863 S | 5/2006 | Davis et al. | |
| 7,207,510 B2 * | 4/2007 | Wong | B02C 18/305 248/362 |
| 7,226,230 B2 | 6/2007 | Liberatore | |
| 7,314,328 B2 | 1/2008 | Liberatore | |
| D562,625 S | 2/2008 | Alikhan et al. | |
| 7,325,994 B2 | 2/2008 | Liberatore | |
| D573,462 S | 7/2008 | Karam | |
| 7,465,118 B2 | 12/2008 | Liberatore | |
| D591,389 S | 4/2009 | Born et al. | |
| D592,507 S | 5/2009 | Wachman et al. | |
| D627,595 S | 11/2010 | Jennings | |
| 7,824,123 B2 | 11/2010 | Liberatore | |
| 8,016,507 B2 | 9/2011 | Wright | |
| 8,690,092 B2 * | 4/2014 | Jenkins | B02C 7/188 241/261.3 |
| D716,658 S | 11/2014 | Sillince | |
| D718,132 S | 11/2014 | Leventhal | |
| D729,070 S | 5/2015 | Faria et al. | |
| D786,497 S | 5/2017 | Sudlow et al. | |
| 2001/0038050 A1 * | 11/2001 | Galletti | B23Q 11/1069 241/260.1 |
| 2006/0006263 A1 * | 1/2006 | Chen | B02C 18/301 241/260.1 |
| 2007/0007296 A1 | 1/2007 | Guyot | |
| 2008/0205971 A1 | 8/2008 | Liberatore | |
| 2008/0237278 A1 | 10/2008 | Gaus et al. | |
| 2008/0240843 A1 | 10/2008 | Liberatore | |
| 2009/0001202 A1 * | 1/2009 | Lesar | B02C 18/302 241/82.6 |
| 2009/0045230 A1 | 2/2009 | Liberatore | |
| 2009/0218374 A1 | 9/2009 | Liberatore | |
| 2009/0240204 A1 | 9/2009 | Taylor et al. | |
| 2011/0091590 A1 | 4/2011 | Liberatore | |
| 2011/0108139 A1 | 5/2011 | Wright et al. | |
| 2011/0284670 A1 | 11/2011 | Jenkins et al. | |
| 2014/0299686 A1 * | 10/2014 | Jenkins | B02C 18/301 241/246 |
| 2015/0145364 A1 | 5/2015 | Holcomb et al. | |
| 2016/0143484 A1 * | 5/2016 | Palmer | B02C 18/305 241/82.1 |
| 2016/0228880 A1 * | 8/2016 | Norberg | B02C 18/305 |
| 2017/0267441 A1 | 9/2017 | Johnson et al. | |
| 2018/0056663 A1 | 3/2018 | Asawa | |

OTHER PUBLICATIONS

International Search Report and Written Opinion for PCT/US2020/022666, dated May 18, 2020.
International Search Report and Written Opinion for PCT/US2020/037190, dated Aug. 19, 2020.

\* cited by examiner

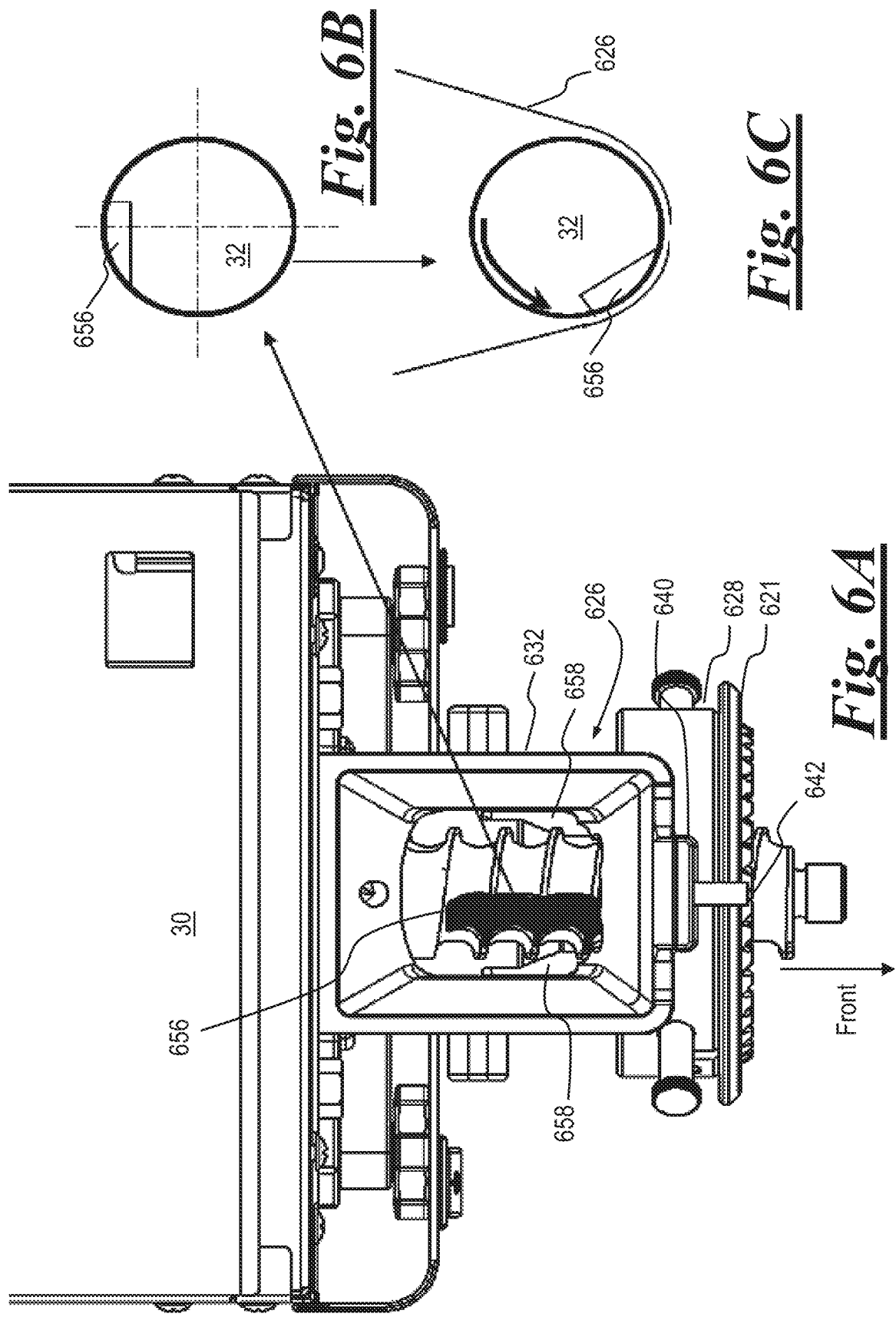

Angle is engineered to capture product at its full size and increases with smaller products making it very effective.

Over center cut out Depth, geometry and interactive product locking location provide a means of trapping shearing and crushing of product.

Capture angle and available volume is poor, and unable to process whole nut products.

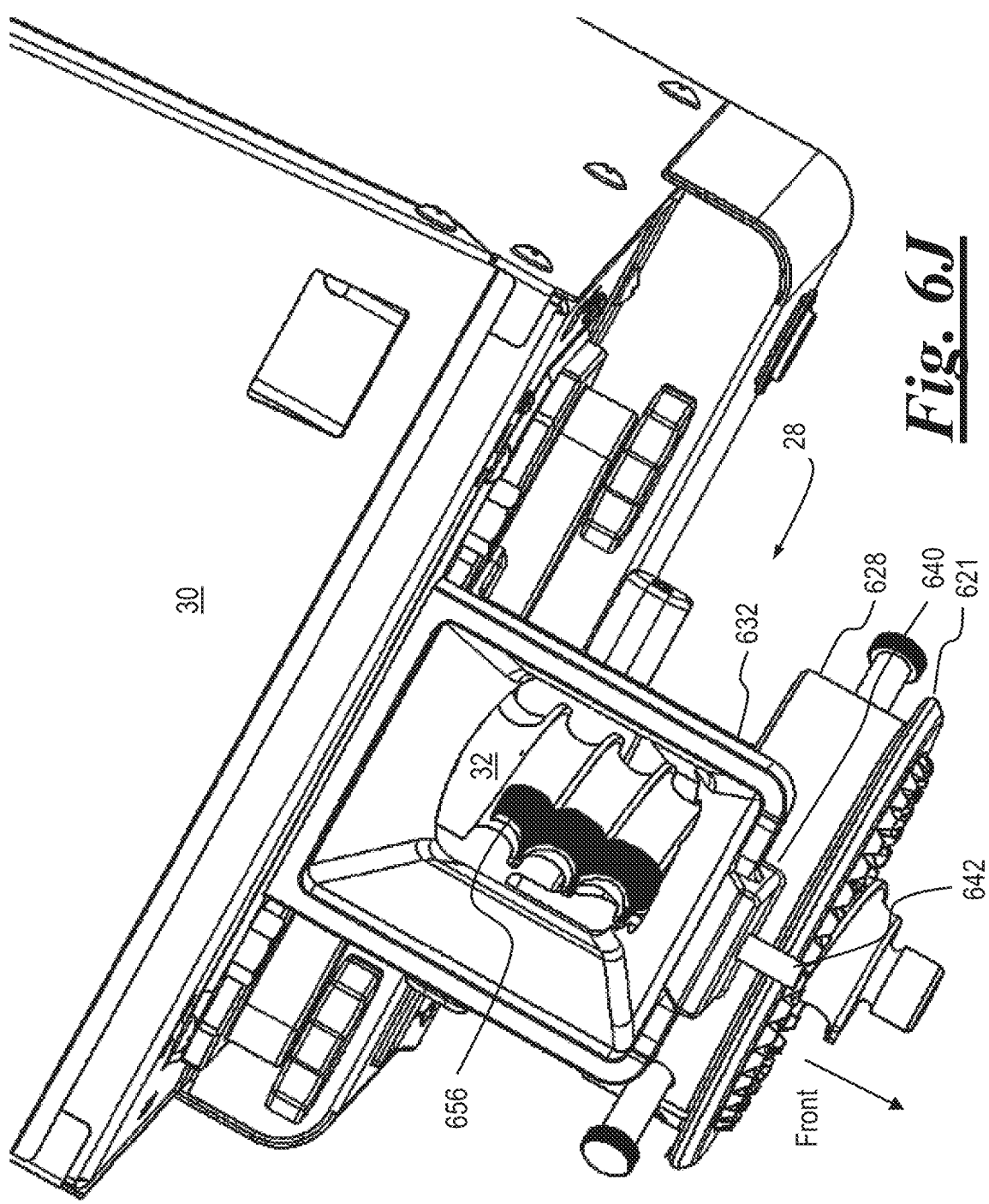

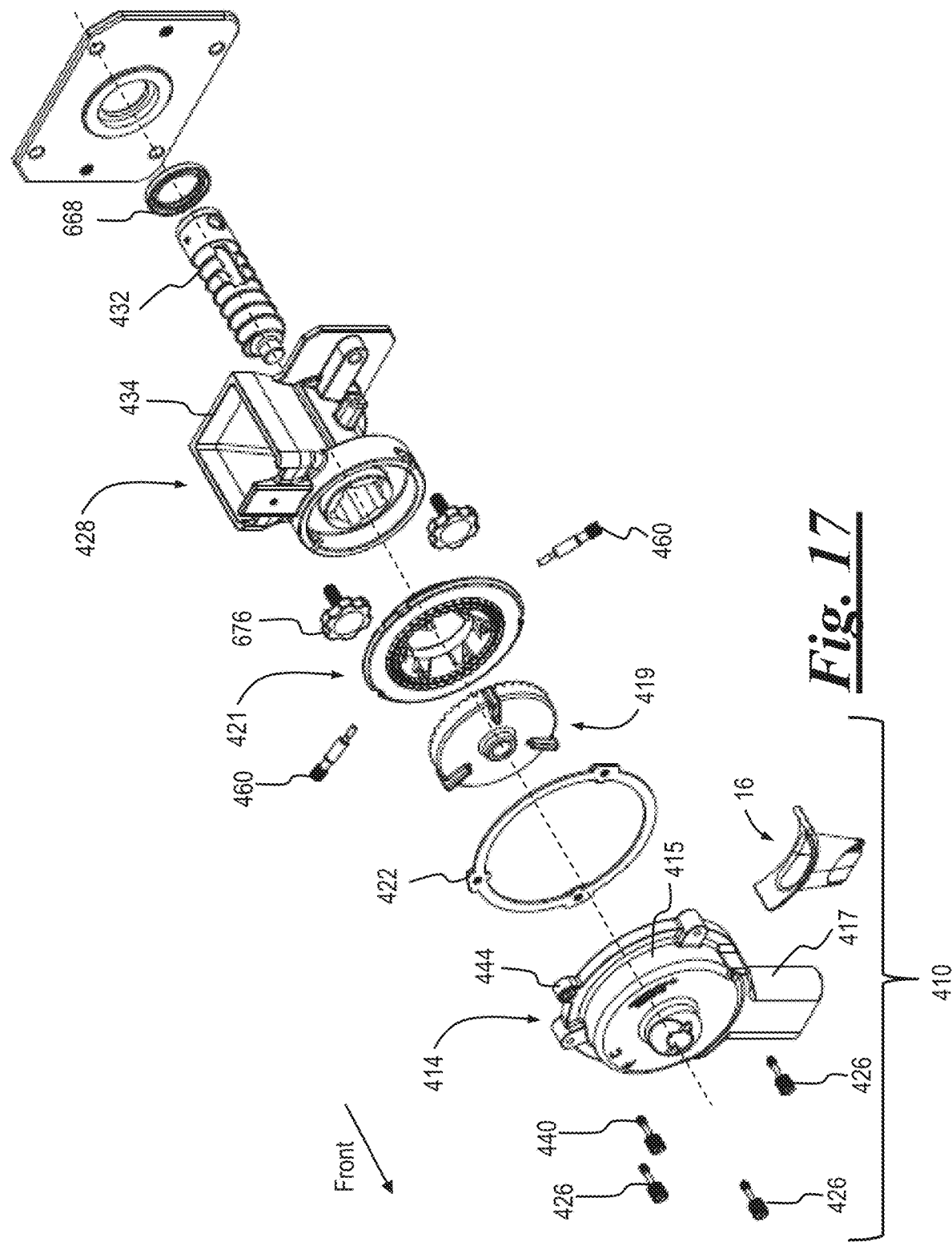

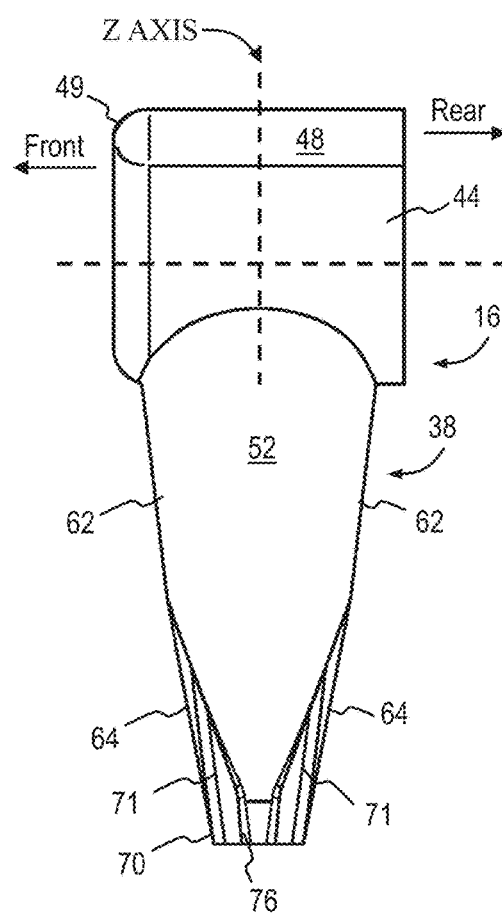
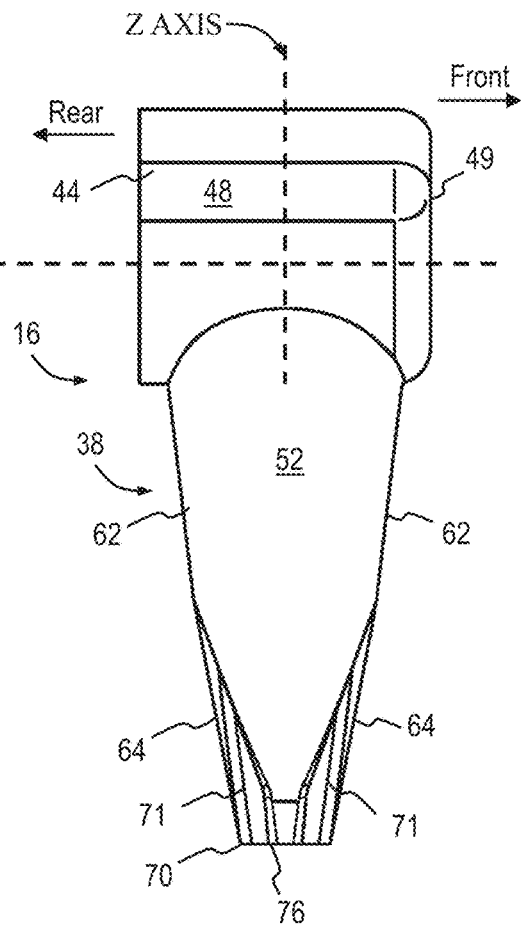
Fig. 34
Fig. 35

VISCOUS FOOD PRODUCT GRINDING AND DISPENSING SYSTEM

CROSS-REFERENCE TO RELATED APPLICATIONS

This application is a continuation of U.S. patent application Ser. No. 15/459,793, filed Mar. 15, 2017, which claims priority to Indian application 201611009273, filed Mar. 17, 2016, U.S. provisional application 62/431,222, filed Dec. 7, 2016, and U.S. provisional application 62/453,759, filed Feb. 2, 2017 and is a continuation-in-part of U.S. design patent application 29/577,721, filed Sep. 15, 2016, the entire contents of each application being incorporated by reference herein.

FIELD

The present invention relates generally to viscous food product grinding and dispensing systems, and in particular to features for such systems configured to improve performance of the production of viscous food paste.

BACKGROUND AND SUMMARY

Grinding dispensers for dispensing bulk food products are used to dispense a wide variety of ground materials, which may include, for example, nuts, coffee, and grain. Generally, such systems include a hollow hopper-type bin having an inlet at an upper end utilized to fill the enclosure with bulk product, a transport section that receives the food product by gravity, a manual or electric motor power source that mechanically drives a transport device and a milling device, and a discharge cover for the milling device. The transport device may be a rotatable auger which is coupled to the power source. The discharge cover includes one or more outlet openings utilized to dispense the material into a container for the user.

Existing grinding dispenser systems provide nut butter freshly ground from various types of nuts, such as peanuts and almonds. In operation of such nut grinding dispensers, a pre-processed nut product is further ground to produce nut butter, which is forced as a viscous paste to the bottom of the discharge cover and dispensed from the outlet opening as an exposed viscous paste stream.

Conventional systems require pre-processed nuts. In other words, they cannot process whole nuts. The present invention overcomes this disadvantage by providing a novel over-center cutout (or notch) that can accommodate whole nuts.

Conventional systems produce an exposed paste stream that is problematic for sanitary reasons. The present invention overcomes this disadvantage by covering dispense residual paste (commonly referred to as "dangle") with a spout (aka shroud).

After the grinding dispenser has been deactivated, conventional systems further produce an exposed residue drip attached to the exterior of the product outlet. The present invention overcomes this disadvantage by providing a nozzle at the product outlet having a generally flexible valve configured to automatically pinch off product residue drips. Thus, the nozzle valve prevents dripping of the product after dispensing has ceased. In some embodiments, the nozzle is covered by a spout to shield the food product outlet from environmental contamination and public tampering.

The present invention achieves another important advantage by utilizing a variable frequency driven (VFD), 3 phase motor, that provides higher torque with a volumetrically smaller motor. The high torque allows a more efficient grinding of product. The smaller motor allows a smaller overall footprint. Utilizing a VFD controller allows for motor operation using various world-wide input voltages and frequencies, maintains improved torque and horsepower, and can provide specific torque/speed profiles via computer program profiles.

The present invention achieves another important advantage by incorporating a safety system that disables the electronic drive system upon detection of removal of either the hopper and/or front cladding (merchandizer).

The present invention provides other important novel advantages, such as a pivoting shutter (aka gate) on the hopper dispenser, a manually adjustable texture modification system fed by a unique flute arrangement, and a run time adjustment feature.

The pivoting gate automatically closes off the product bin discharge chute as the bin is removed from the unit, reducing product loss. Texture adjustment screws provide easy manual adjustment, without the need for special tools, of a rear fixed grinder position, relative to a front rotating grinder, so as to adjust the coarseness, or product texture. Utilizing manual fasteners for the disassembly and reassembly of the grinding system shortens the clean time and product change-over time for the unit. The run time adjustment feature allows the unit owner to quickly select from a plurality of pre-determined run times for the motor.

According to an aspect of the present invention, there is provided a transport section for a viscous food product grinding and dispensing system comprising: an auger having an over-center cutout within a housing sleeve, the interior surface of the housing sleeve including radial flutes for regulating product flow from the sleeve to the milling device.

According to an aspect of the present invention, there is provided an outlet adapter for a viscous food product dispensing system, comprising: a discharge cover, the discharge cover configured to receive a pressurized supply flow of particulate food product and to house a milling device for processing the particulate food product into a pressurized supply flow of viscous food paste for dispensing; and a flexible nozzle coupled at a proximal end to the discharge cover, the flexible nozzle including a valve configured to flex to an open position under force from the pressurized supply flow of viscous food paste and return to a closed position once the supply flow ceases, the valve having an outlet being configured to pinch off and sever the viscous food paste as the valve returns to the closed position; whereby the severing of the viscous food paste by the outlet reduces the amount of viscous food paste remaining attached to an external face of the outlet.

In one embodiment, an outlet adapter includes a discharge cover and a flexible nozzle. The discharge cover is configured to receive a pressurized supply flow of particulate food product and to house a milling device for processing the particulate food product into a supply flow of viscous food paste for dispensing. The nozzle includes a proximal end, a distal end and a valve with a hollow interior passage. The nozzle is coupled at the proximal end to an aperture in the discharge cover. The hollow interior passage includes an opening at the proximal end configured to receive the viscous food paste. The hollow interior passage tapers downwardly towards a port at the distal end. The valve includes a flexible portion; the flexible portion is biased in a normally closed position and flexes to an open position under sufficient force for discharge of the viscous food paste.

The flexible portion is configured such that force from the pressurized supply flow of the viscous food paste urges the port open and, once the supply flow stops, the port to returns to the closed position, thus pinching off or severing the viscous food paste.

BRIEF DESCRIPTION OF THE DRAWINGS

Further features of the inventive embodiments will become apparent to those skilled in the art to which the embodiments relate from reading the specification and claims with reference to the accompanying drawings, in which:

FIG. 6A is a partial top plan view of the system of FIG. 3 shown with the bin, front rotating grinder and discharge cover removed;

FIG. 6B is a front end view in section of a cutout in the auger/transport device, and FIG. 6C, is the section of FIG. 6B shown rotated counterclockwise, also showing the interior surface of the adjacent sleeve;

FIG. 6J is a top perspective view of the system of FIG. 6A;

FIG. 17 is an exploded view of the transport section, outlet adapter, and milling device of FIG. 15;

FIG. 34 is a left side elevation view of the flexible nozzle of FIG. 28;

FIG. 35 is a right side elevation view of the flexible nozzle of FIG. 28;

DETAILED DESCRIPTION

Figure 1:
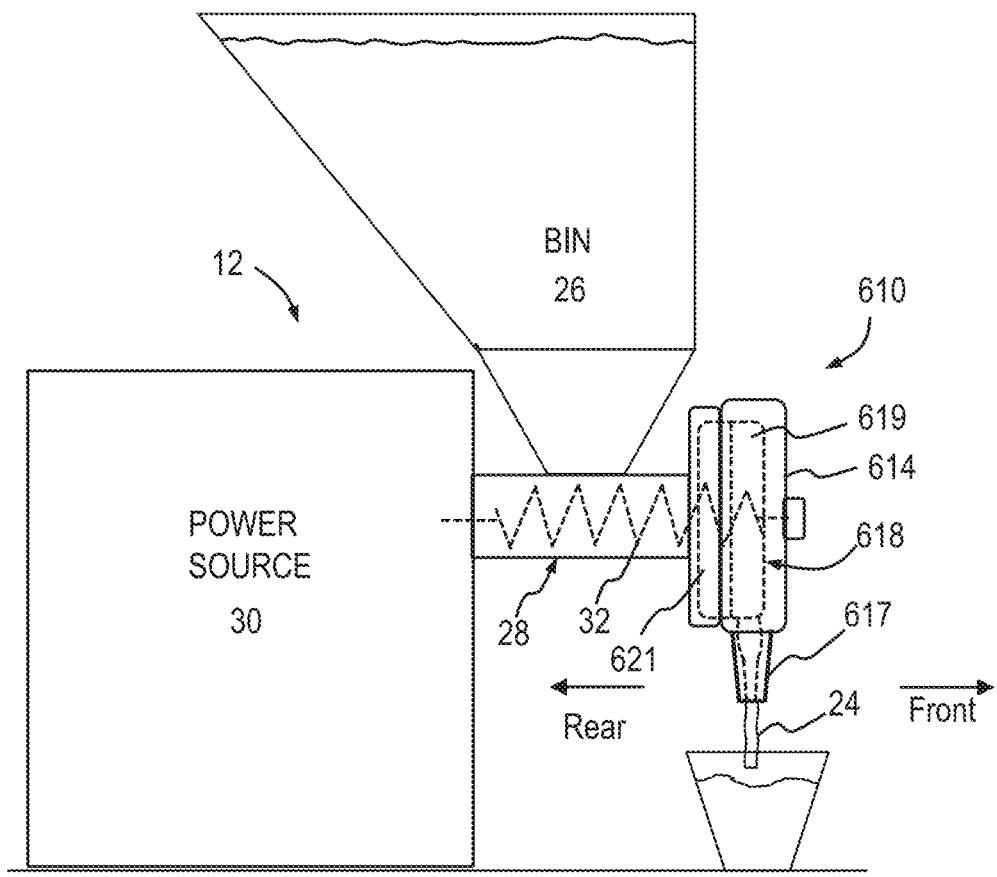
FIG. 1 is a schematic side view of a viscous food product grinding and dispensing system according to an embodiment of the present invention.

In the discussion that follows, like reference numerals are used to refer to like structures and elements in the various figures.

Figure 2:
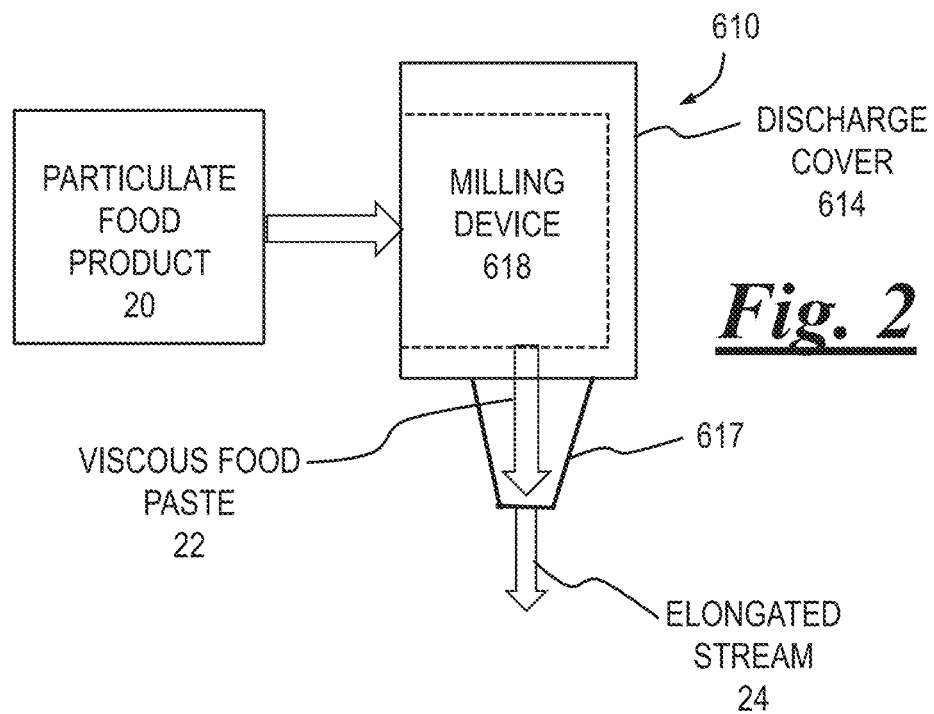
FIG. 2 is a schematic flow diagram of the system of FIG. 1.

The general arrangement of a viscous food product grinding and dispensing system 12 ("system 12") of the present invention is shown in FIGS. 1 & 2. System 12 includes an outlet adapter 610 having a discharge cover 614 with a spout 617. Discharge cover 614 is configured to house a milling device 618 and to be operatively connected to a transport section 28 of system 12. Milling device 618 includes an opposing set of grinding members or plates, such as front rotating grinder 619 and a rear fixed grinder 621. Front rotating grinder 619 is adapted to rotate with respect to rear fixed grinder 621.

In operation, milling device 618 receives a supply flow of particulate food product 20 and processes the particulate food product into a pressurized supply flow of viscous food paste 22 for dispensing through spout 617 as an elongated stream 24. Food product 20 may include a variety of nuts, including peanuts and almonds. Viscous food paste 22 may include a variety of nut butters, such as peanut butter and almond butter.

System 12 includes a bin 26 for storage of particulate food product 20, gravity fed transport section 28 that receives the particulate food product, and a power source 30 that drives a transport device 32 as well as milling device 618. Transport device 32 is located within transport section 28 and operates to move particulate food product 20 downstream to milling device 618.

Transport device 32 is an auger in one embodiment, which is designed to work in conjunction with the internal features of transport section 28 in order to perform an initial processing of the particulate food product 20. The initial processing involves a rough cutting and crushing of the product. The subsequent processing of the rough product involves relatively finer grinding performed by the milling device 618.

In the embodiment shown in FIGS. 1 and 2, elongated stream 24 is not pinched off or severed. Rather, the stream bifurcates upon cessation of flow leaving a residual, or dangle. In some embodiments, as described more fully herein, the outlet adapter further includes a flexible discharge nozzle adapted to pinch off or sever stream 24 upon cessation of flow.

Figure 3:
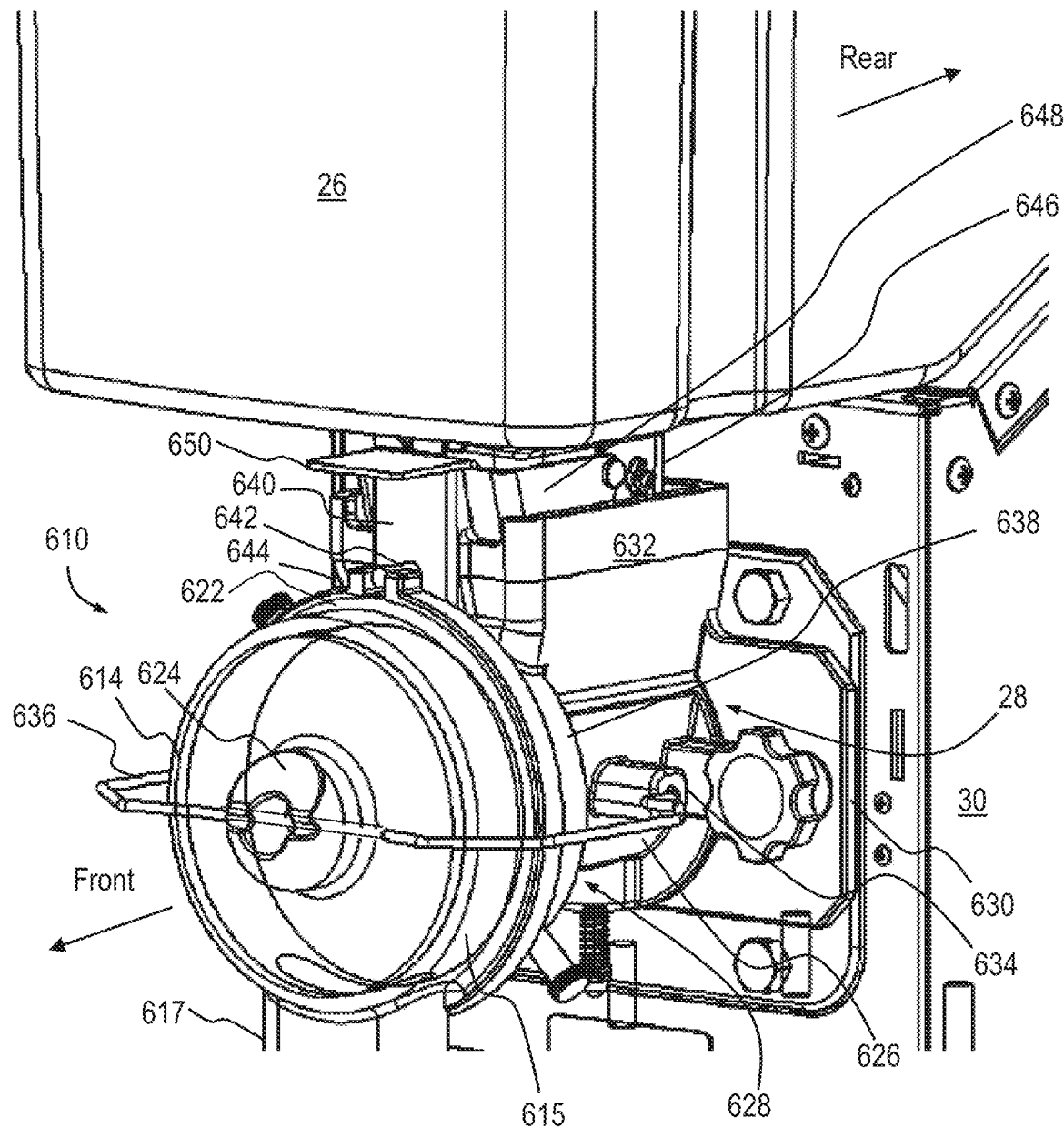
FIG. 3 is a partial front perspective view of a viscous food product grinding and dispensing system according to an embodiment of the present invention, shown without the milling device.

Now referring to FIG. 3, discharge cover 614 (viewed as if transparent) has a generally cylindrical shape and includes an annular sidewall 615, annular flange 622 at the rear, and a nose 624 at the front. Transport section 28 includes a sleeve 626, a front housing 628, a rear plate 630, and a chute inlet 632 extending from the top of the sleeve. Sleeve 626 further includes a pair of opposing nodes 634 configured to receive and secure opposing ends of a clamp bar 636. Nose 624 is configured to receive and secure a front portion of clamp bar 636. Front housing 628 includes an annular perimeter 638 and an arm 640 extending from the top of the annular perimeter and connected to the front of chute inlet 632. A post 642 is fastened to the front of arm 640. In assembling discharge cover 614 to front housing 628, a receptor 644 on top of annular flange 622 is first aligned with and inserted onto post 642. Next, clamp bar 636 is secured to nose 624 and the ends of the clamp bar secured to nodes 634. Alternatively, discharge cover 614 is aligned against front housing 628, secured by clamp bar 636, and then post 642 is fastened to arm 640 through receptor 644.

Bin 26 includes a chute 646 at the bottom for discharge of particulate food product 20. Bin 26 further includes a rotatable gate 648 configured to pivot from a normally closed position to an open position. In the closed position (FIGS. 4, 5), gate 648 covers the bottom opening of chute 646, preventing discharge of particulate food product 20. In the open position (FIG. 3), gate 648 is pivoted away from the bottom opening of chute 646 towards the front of the chute, thus allowing for product discharge. In assembling bin 26 to transport section 28, chute 646 is inserted into chute inlet 632. During insertion of chute 646 the top of arm 640 engages a flap 650, causing the front rotation of gate 648.

Figure 4:
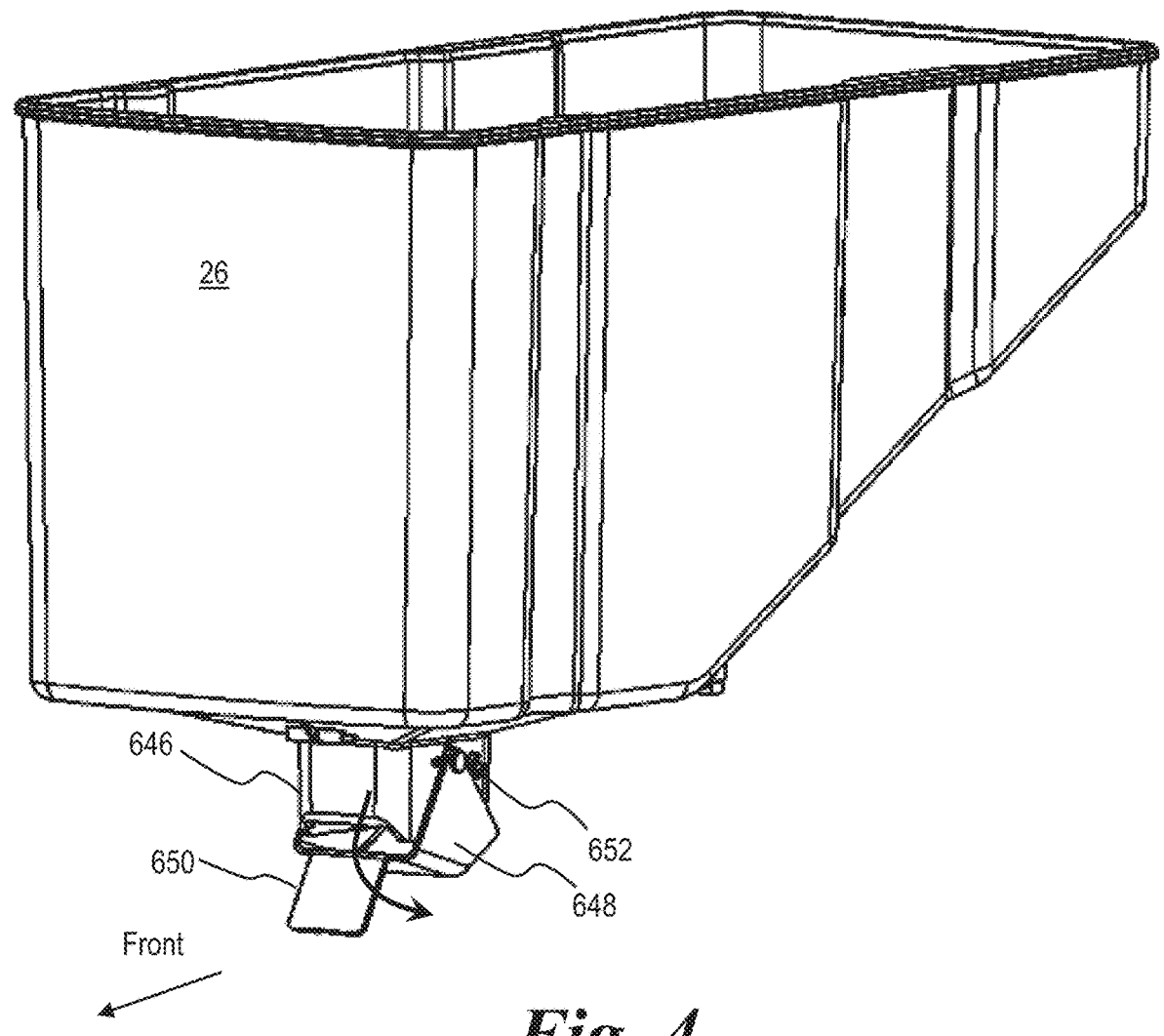
FIG. 4 is a front perspective view of the bin of FIG. 3 shown removed from the system.
Figure 5:
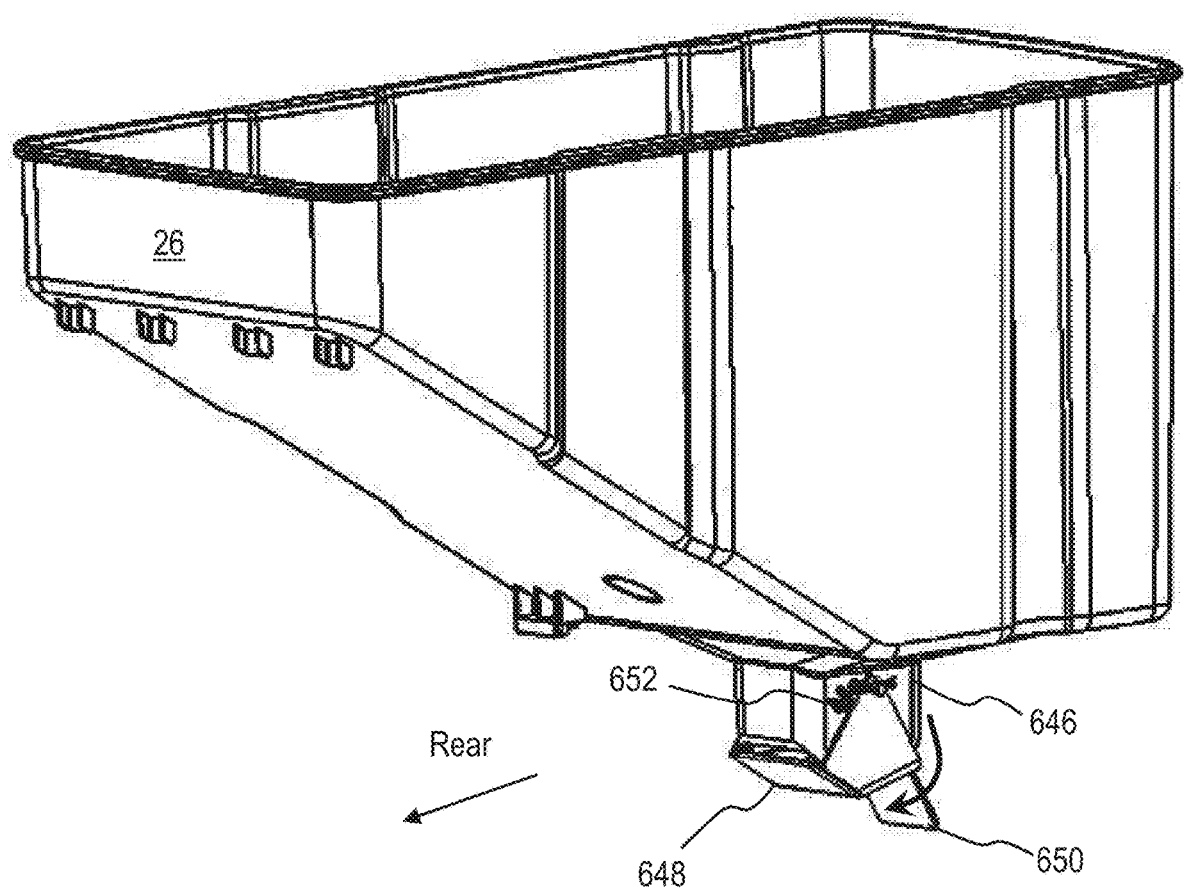
FIG. 5 is a rear perspective view of the bin of FIG. 4.

Referring to FIGS. 4 and 5, bin 26 may be removed from transport section 28 for cleaning and/or change-over of product. Upon removal of chute 646 from chute inlet 632, flap 650 rotates (either by gravity or spring assisted), thus pivoting gate 648 back to the closed position. Chute 646 further includes an opposing pair of stops 652 positioned on the sides of the chute. Stops 652 define a limit of movement of gate 648 in the closed position. Thus, gate 648 acts to minimize or substantially eliminate leakage of product from the bottom opening of chute 646 during removal of bin 26.

Referring to FIGS. 6A-6K, cutout portion 656 (aka over-center cutout) is disposed in transport device 32. As exemplified in FIG. 6B, cutout portion 656 is disposed in transport device 32 in an over-center position. Cutout portion 656 is formed as a notch having two perpendicular sides of unequal length. Cutout portion 656 is aligned below the opening of chute inlet 632. Those of skill in the art will appreciate that the dimensions of cutout portion 656 are sized commensurate with a target product (e.g. almond, or peanut). In one embodiment, dimensions of 7.637 mm and 16.665 mm are used.

Figure 6D:
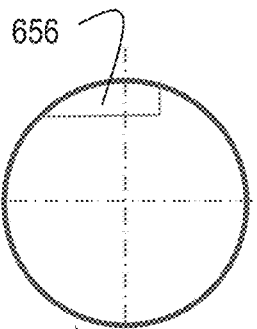
FIG. 6D is a front end view in section of a cutout in the auger/transport device (identical to FIG. 6B)
Figure 6E:
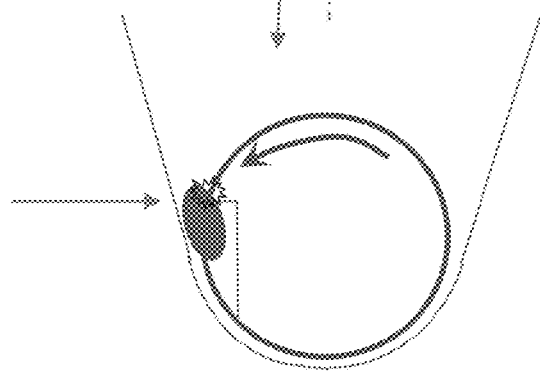
FIG. 6E is the section of FIG. 6D shown rotated counterclockwise showing a captured nut.
Figure 6F:
FIG. 6F is the section of FIG. 6E shown rotated further counterclockwise showing a partially crushed nut (it should be noted that the same effect can be achieved with a clockwise configuration)
Figure 6G:
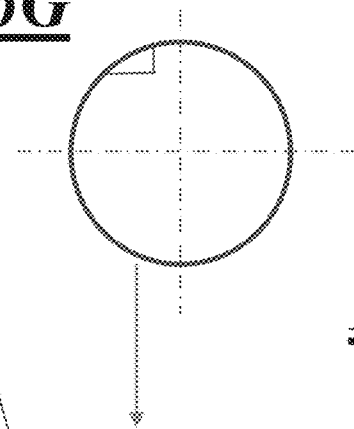
FIG. 6G is a front end view in section of a cutout in a prior art device.
Figure 6H:
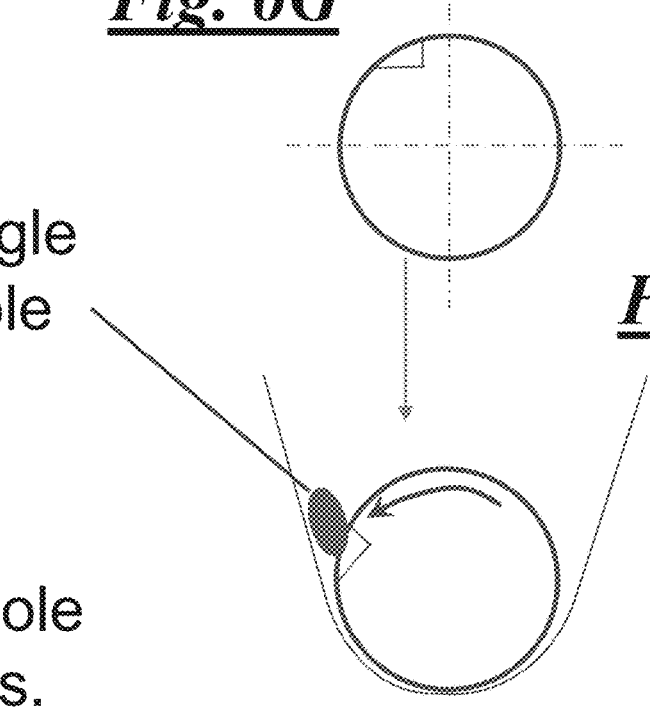
FIG. 6H is the section of FIG. 6G shown rotated counterclockwise showing an un-captured nut.
Figure 6I:
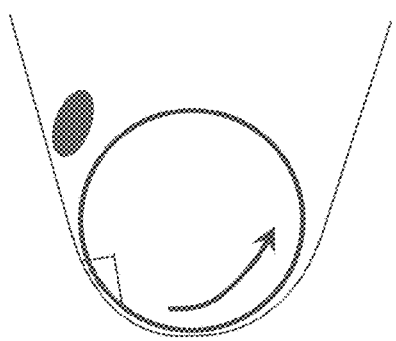
FIG. 6I is the section of FIG. 6H shown rotated further counterclockwise, and showing an escaped nut.

The foregoing configuration provides an important advantage over conventional systems in that whole nuts (e.g. almonds or peanuts) can be captured and broken, whereas conventional systems require a pre-processed, partially broken product. As shown in FIGS. 6E & 6F, cutout portion 656 engages and breaks a whole nut against chamber wall (sleeve 626). As shown in FIGS. 6G through 6I, the inferior cutout of conventional systems cannot capture and break a whole nut because it pops out and escapes.

Figure 6K:
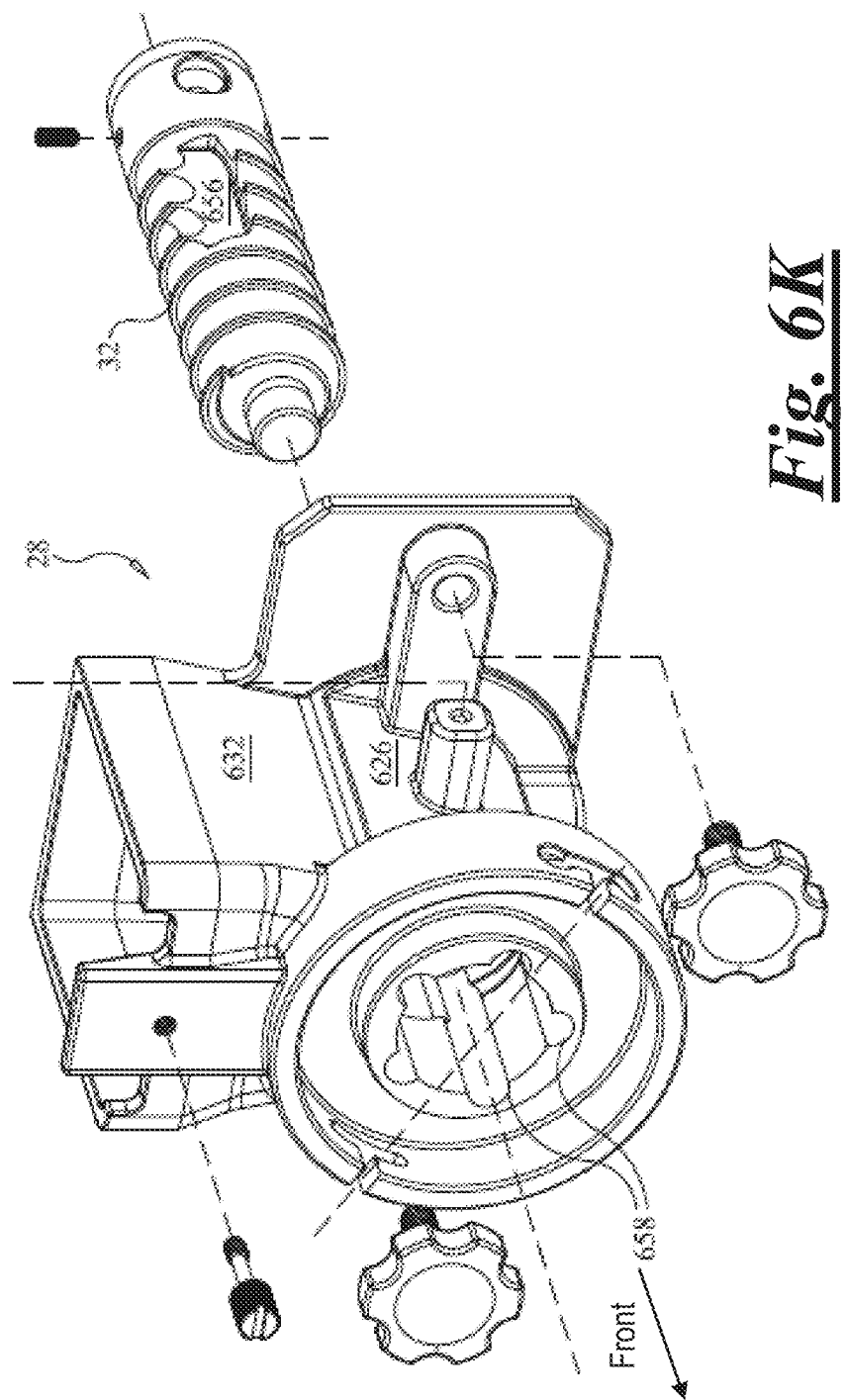
FIG. 6K is an exploded side perspective view showing the transport section with transport device of FIG. 3.
Figure 7:
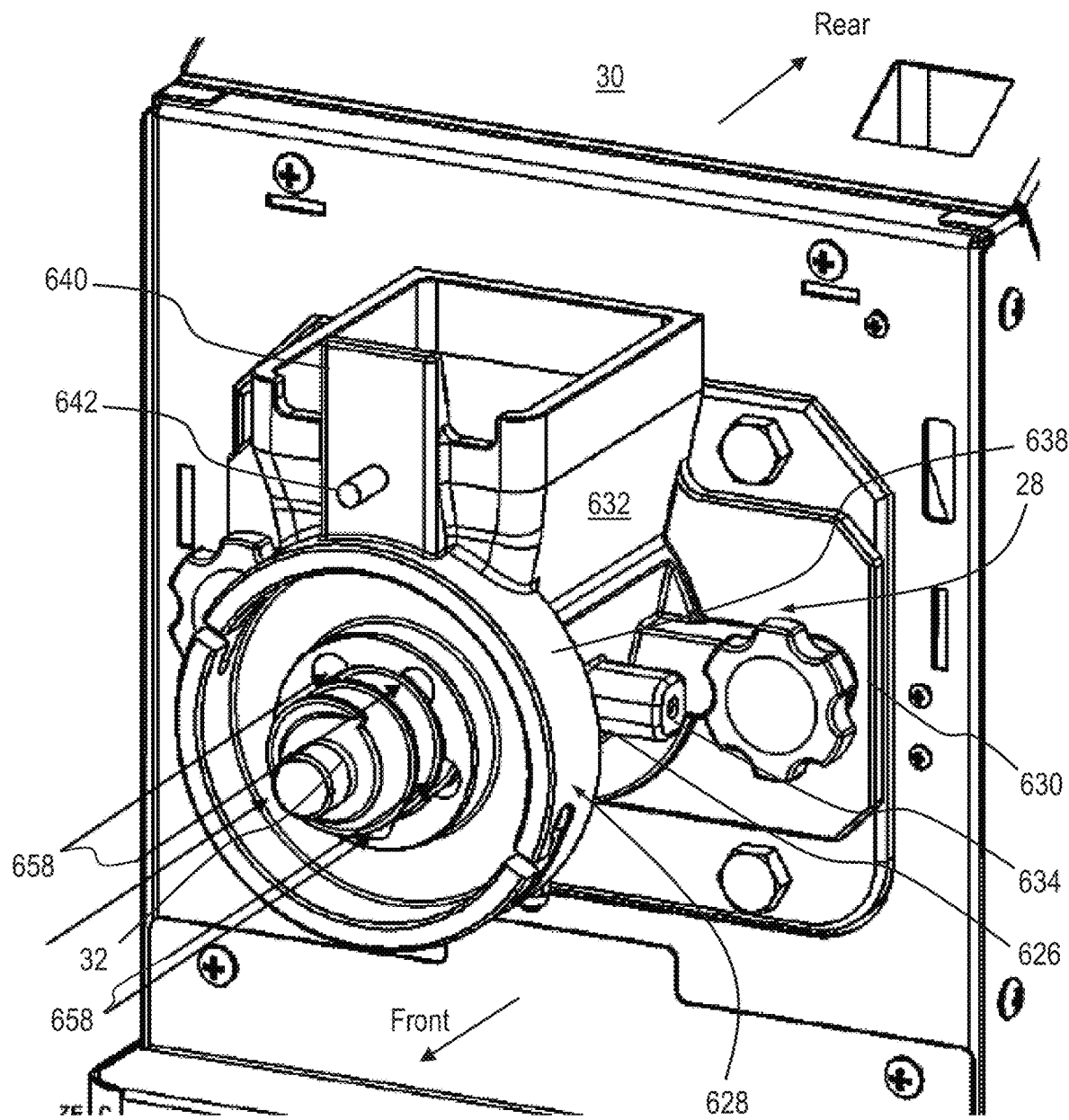
FIG. 7 is a front perspective view of the system of FIG. 6A shown with the rear fixed grinder removed.

Referring to FIGS. 6K and 7, the rear portion of front housing 628 includes a plurality of radially equally spaced-apart flutes 658 disposed around transport device 32. Flutes 658 are longitudinal recesses along a portion of the interior surface of sleeve 626, configured in number and size to maximize product flow from sleeve 626 forward toward milling device 618. In the embodiment shown in FIG. 6K, the bottom three flutes 658 extend rearwardly along the interior surface of sleeve 626 below chute inlet 632 (see also FIG. 6A).

The number and size of flutes can be varied to adjust flow. In one embodiment (FIG. 7), five flutes, each being approximately 8 mm in diameter, half depth, are utilized. In another embodiment, 4 flutes are used which results in a lower flow rate and lower current draw on the motor.

Figure 8:
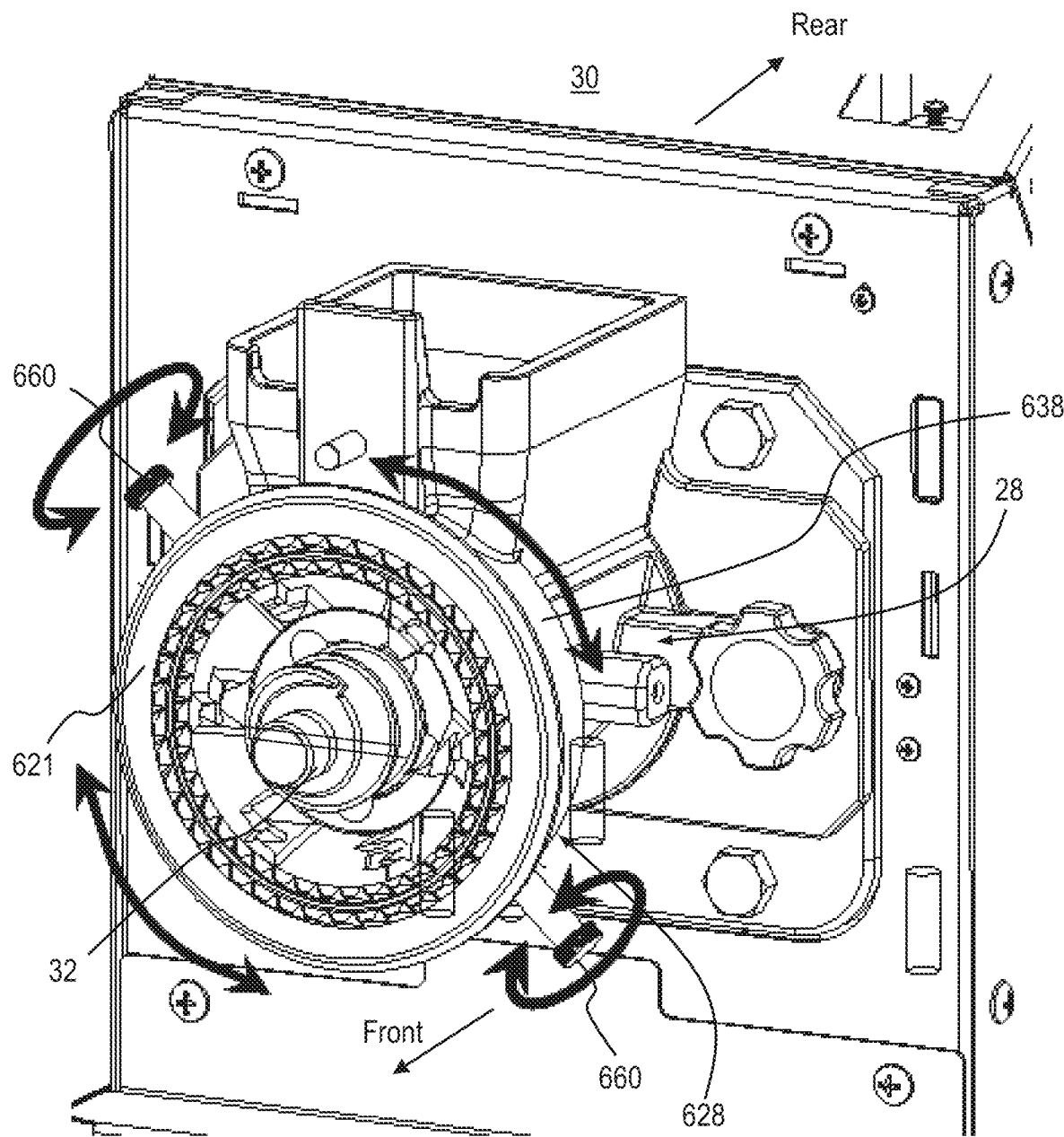
FIG. 8 is a front perspective view of the system of FIG. 6A.
Figure 9:
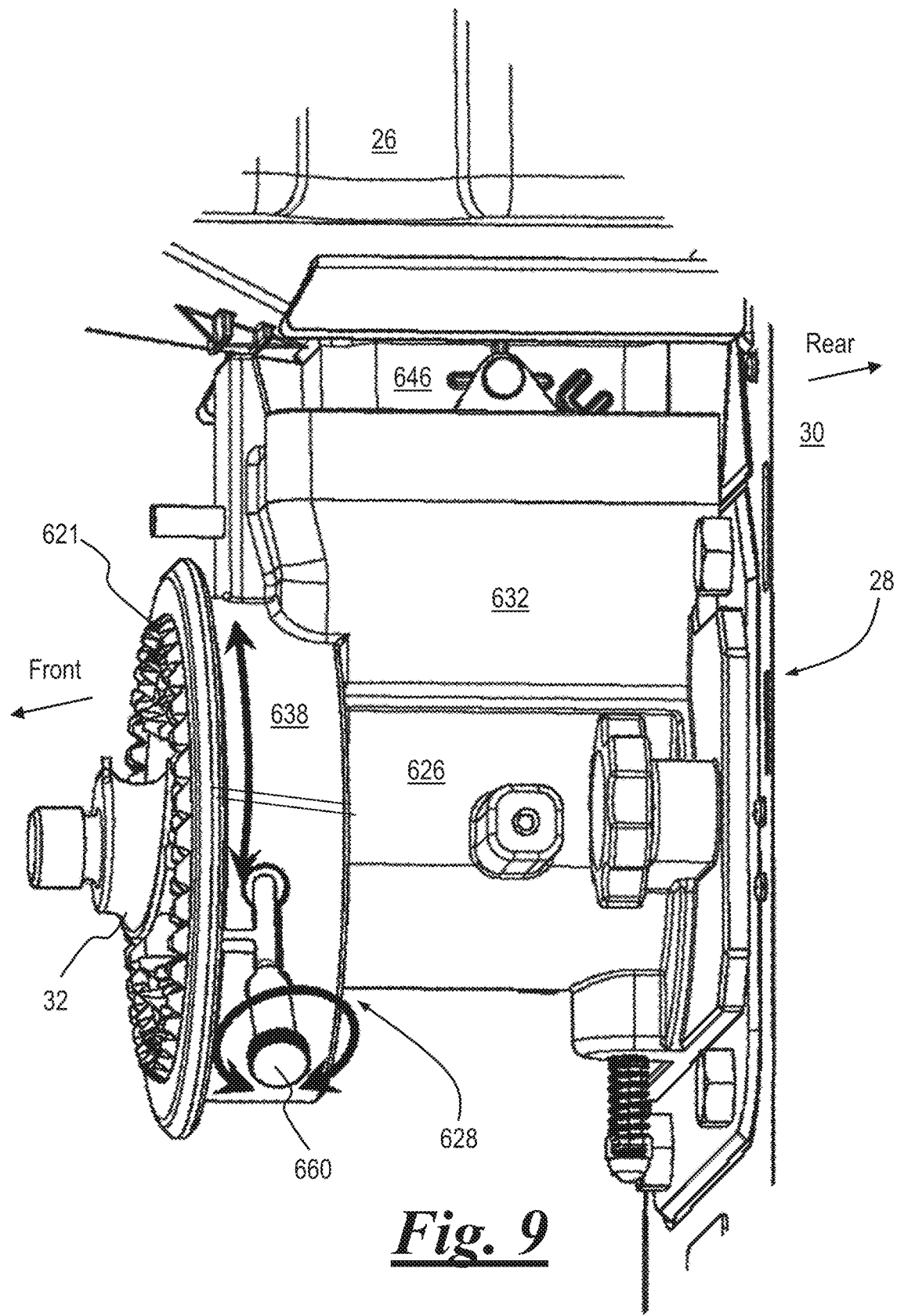
FIG. 9 is a side perspective view of the system of FIG. 3 shown with the front rotating grinder and discharge cover removed.

Referring to FIGS. 8 and 9, a pair of opposing texture adjustment screws 660 accessible through annular perimeter 638 allow adjustment of viscous food paste texture from coarse to fine. For nut products, the adjustments result in crunchy or creamy nut butter. Texture adjustment screws 660 are inserted through openings in annular perimeter 638 and are secured in corresponding helical slots within rear fixed grinder 621. Adjustment is made by loosening texture adjustment screws 660 and rotating the rear fixed grinder 621, relative to the longitudinal axis of transport device 32, into the desired position closer or further away from front rotating grinder 619, then re-tightening the texture adjustment screws. Preferably, the adjustment does not require the use of special tools, and the screws can be manually rotated. The top end of texture adjustment screws 660 may be any suitable type of thumb screw, such as including a knurled surface to allow ease of manual operation.

Figure 10:
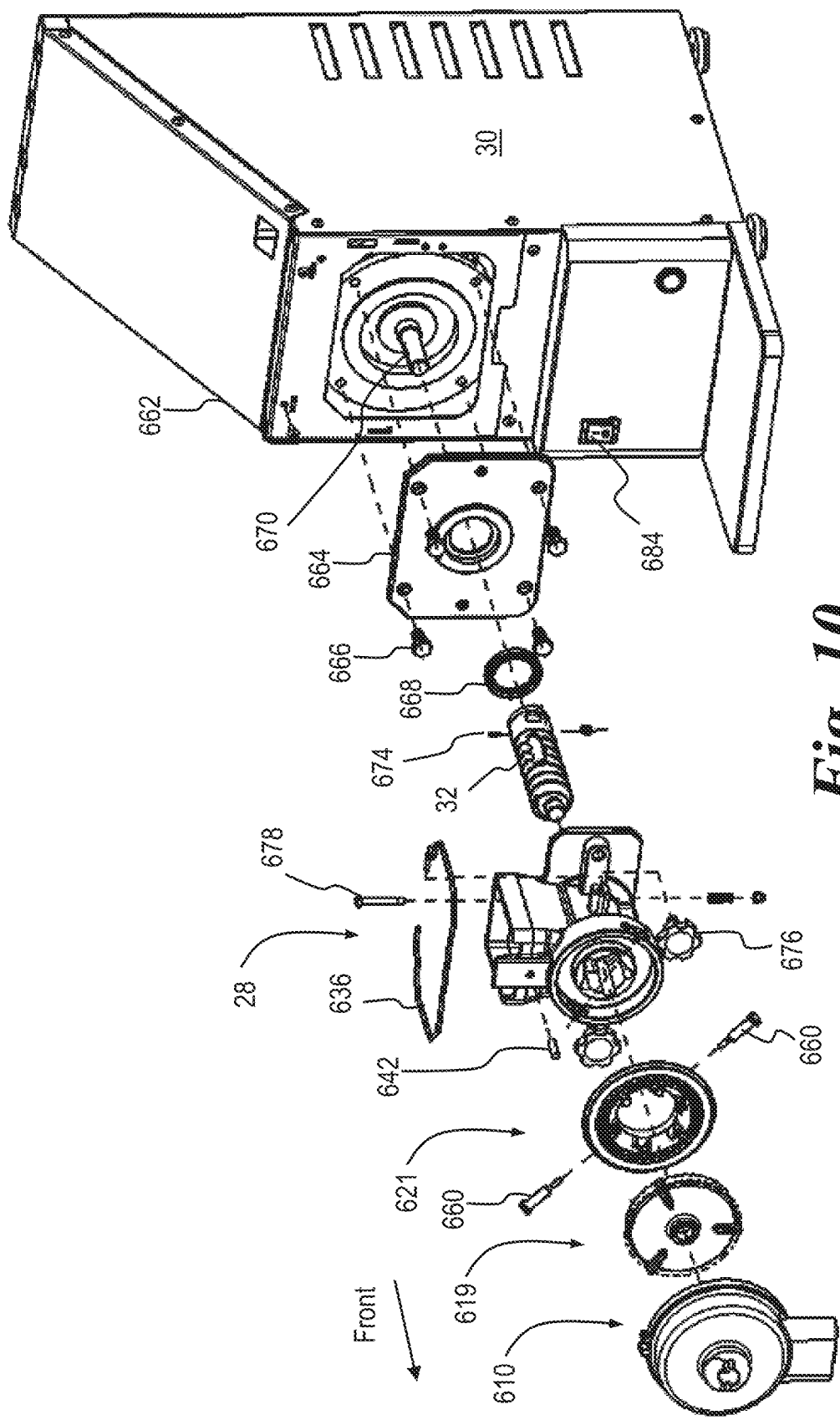
FIG. 10 is an exploded view of the system according to an embodiment of the present invention, shown with the bin removed.
Figure 11:
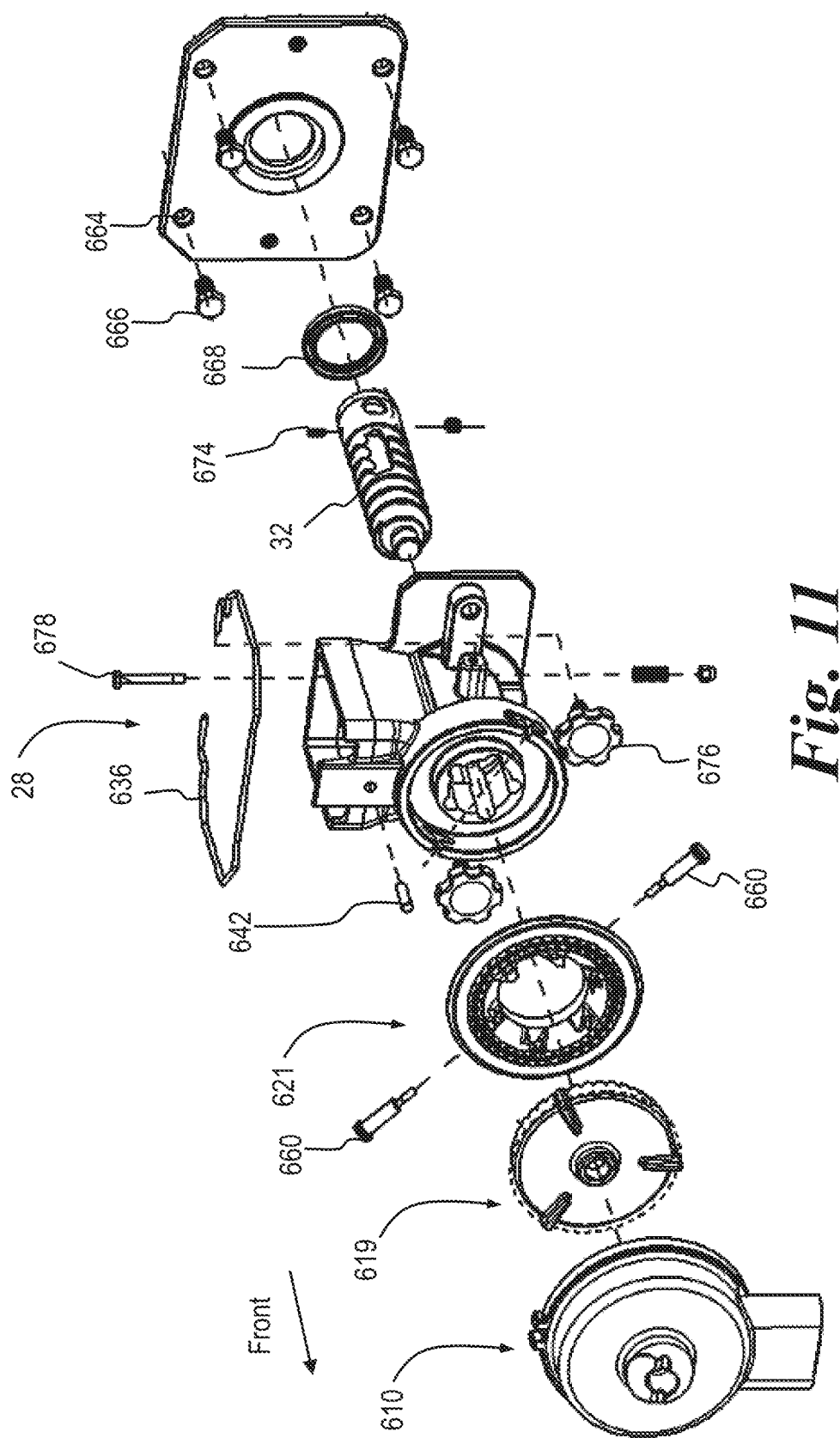
FIG. 11 is the exploded view of FIG. 10 shown without the power source and enclosure.

Referring to FIGS. 10 and 11, manual fasteners may be used for assembly and disassembly of transport section 28, transport device 32, and outlet adapter 610 from power source 30. Assembly and disassembly without special tools acts to reduce device-cleaning time and product change-over time, and reduces the potential for loss of special tools. Referring to FIG. 10, power source 30 is protected by an enclosure 662. A backer plate 664 is secured to enclosure 662 via thumb screws 666. A ring 668 is placed in an opening in backer plate 664, and a shaft 670 of a motor 672 (see motor in FIG. 12) extends forward through the opening.

The rear end of transport device 32 is secured to shaft 670 via screw set 674. Next, transport section 28 is inserted onto transport device 32 and rear plate 630 is secured to backer plate 664 via knobs 676. Then the transport device is secured to the transport section via fastener set 678. The rear fixed grinder is secured to front housing 628 via texture adjustment screws 660, as described above. Front rotating grinder 619 is inserted onto the front of transport device 32, and outlet adapter 610 is secured to front housing 628 via post 642 and clamp bar 636 as described above. Thus, as the front end of transport device 32 is coupled to front rotating grinder 619, the front rotating grinder is operably coupled to power source 30.

Figure 12:
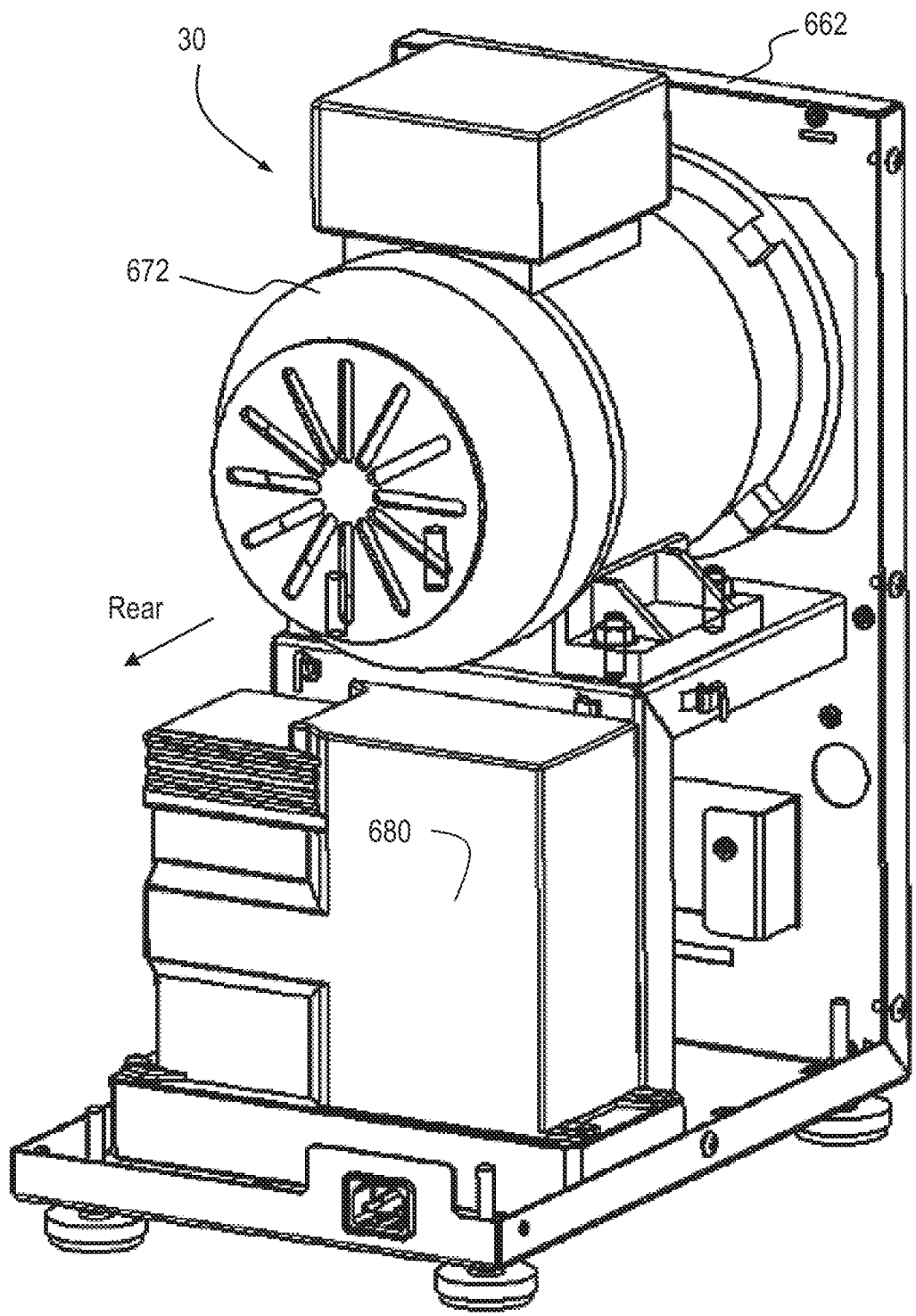
FIG. 12 is a rear perspective view of the power source and enclosure of FIG. 10 shown with a rear portion of the enclosure removed.
Figure 13:
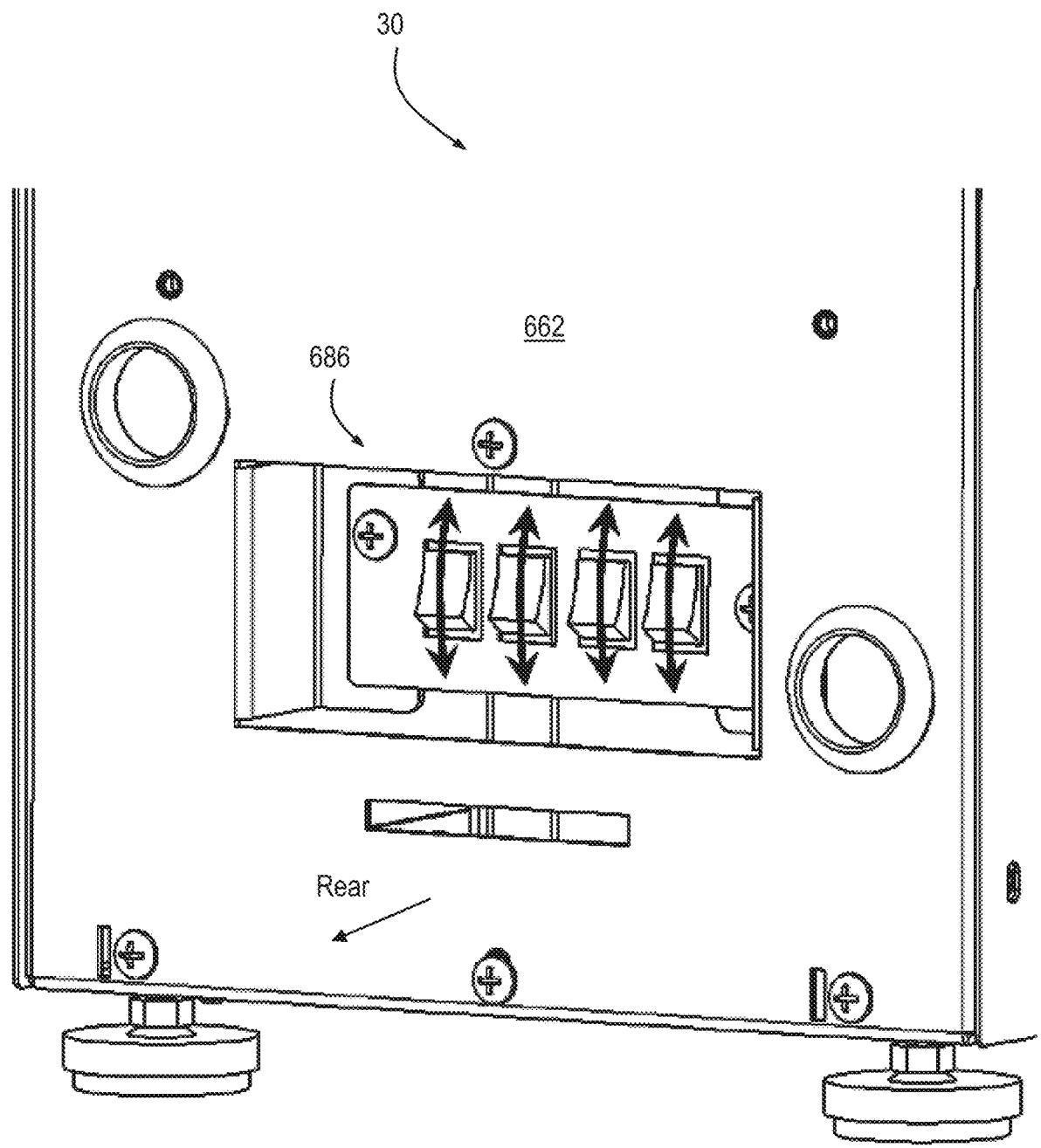
FIG. 13 is a partial rear perspective view of the power source enclosure of FIG. 10.
Figure 14:
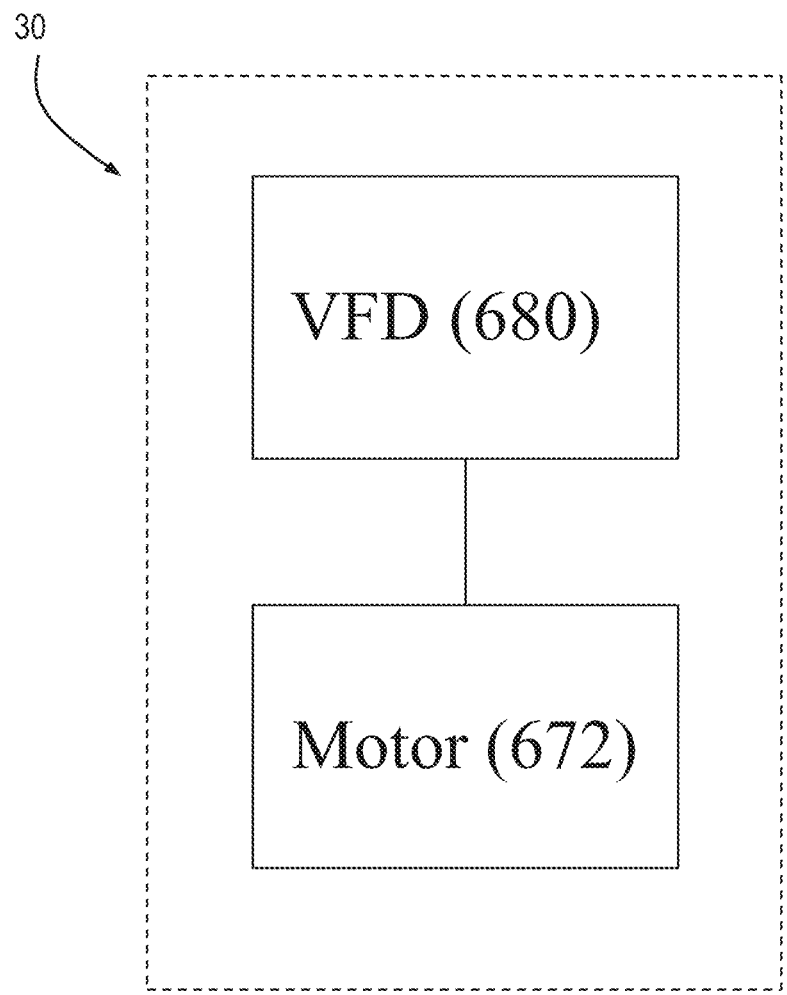
FIG. 14 is a block diagram of the power source of FIG. 10.

Referring to FIGS. 12 through 14, power source 30 further includes a variable frequency drive (VFD) controller 680 operatively connected to motor 672. VFD controller 680 is in electrical communication with motor 672 and operator interfaces, which include an on/off switch 684 (shown in FIG. 10) and a time adjustment feature 686 (shown in FIG. 13).

VFD controller 680 enables motor 672 to operate using various world-wide input voltages and frequencies, and maintains improved torque and horsepower. Further, VFD controller 680 includes overload protection with single push button recovery and PLC controllability to provide specific user-selectable and customizable torque/speed profiles via computer program profiles.

In one embodiment, a 60 Hz, 110 Volt, 3 phase, VFD controlled, 1.5 hp motor is used. This arrangement allows high torque from a relatively smaller motor. Conventional systems utilize single phase motors that are necessarily larger. In another embodiment, a 230V, 50 Hz system is provided. The following input power options are preferred: 110V/60 Hz, 220V/60 Hz, and 230V/50 Hz.

Referring to FIG. 13, a group of toggle switches in the rear side of enclosure 662 facilitates a time adjustment feature 686. The switches are operatively connected to VFD controller 680. Time adjustment feature 686 allows selection from a plurality of pre-determined run times for motor 672. For example, the pre-determined run times may be selected from a range of 15 seconds to 180 seconds. Time adjustment feature 686 is a "user-friendly" feature that takes the guess work out of adjusting unit run time. For example, it may include a series of four toggle switches, the first switch corresponding to 15 seconds, the second corresponding to 70 seconds, the third corresponding to 125 seconds and the fourth corresponding to 180 seconds run time. User positioning of on/off switch 684 to the "on" position causes activation of system 12 through VFD controller 680. Activation of system 12 causes motor 672 to operate for the maximum pre-determined run time, unless overridden by the user positioning the on/off switch 684 to the "off" position.

Figure 15:
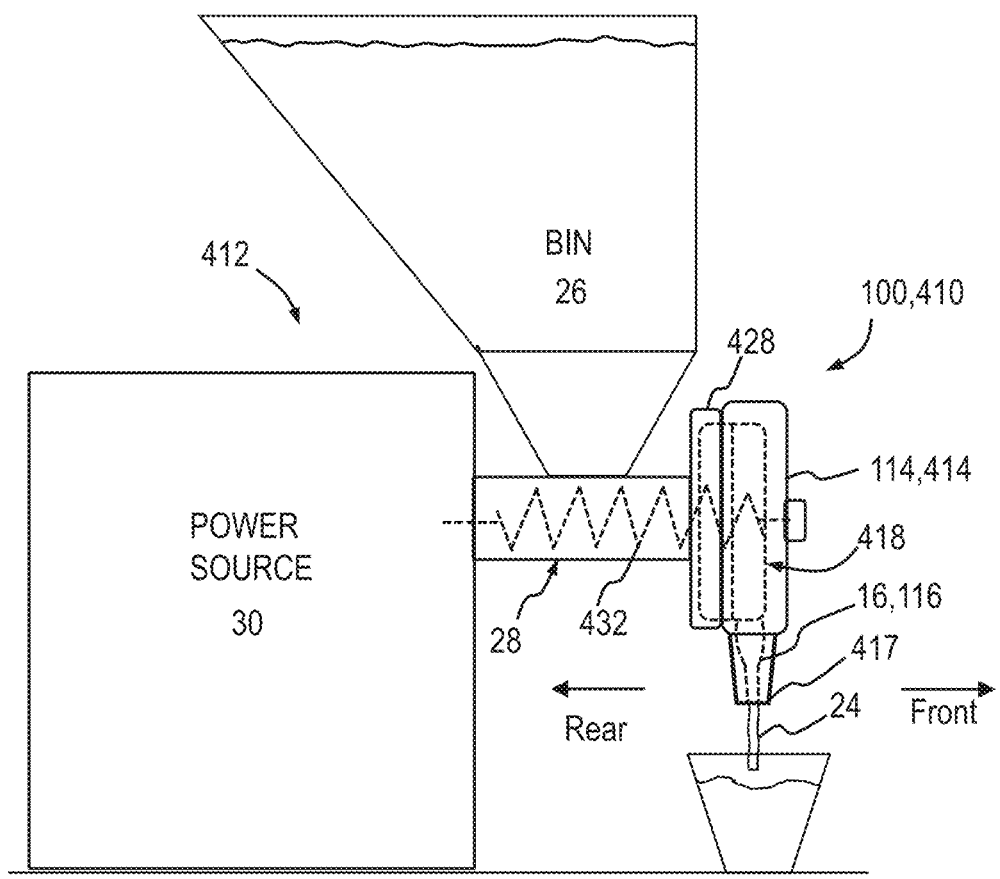
FIG. 15 is a schematic side view of a viscous food product grinding and dispensing system with alternative outlet adapter according to another embodiment of the present invention.
Figure 16:
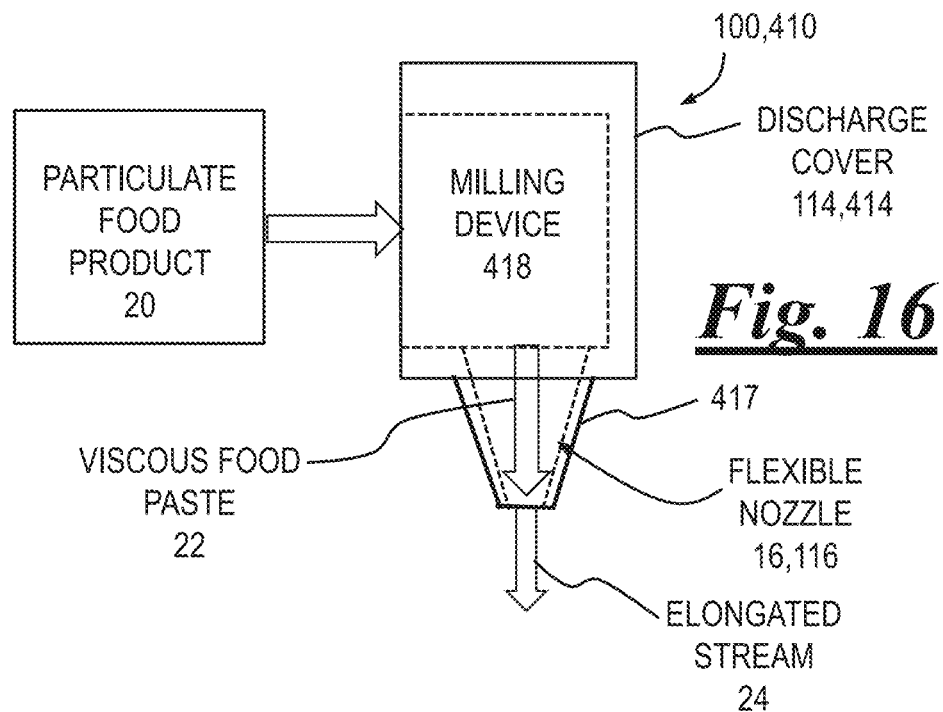
FIG. 16 is a schematic flow diagram of the system of FIG. 15.

The general arrangement of alternative outlet adapters 100/410 for a viscous food product grinding and dispensing system 412 are shown in FIGS. 15 and 16 according to various embodiments of the present invention. Outlet adapters 100/410 include a discharge cover 114/414 and a flexible nozzle 16/116. Discharge covers 114/414 are configured to house a milling device 418 (similar to milling device 618) and to receive flexible nozzle 16/116. System 412 includes a bin 26 for storage of particulate food product 20, gravity fed transport section 28 that receives the particulate food product and a power source 30 that drives a transport device 432 as well as milling device 418. Transport device 432 is located within transport section 28 and operates to move particulate food product 20 downstream to milling device 418. In operation, milling device 418 receives a supply flow of particulate food product 20 and processes the particulate food product into a pressurized supply flow of viscous food paste 22 for dispensing through nozzle 16/116 as an elongated stream 24.

Now referring to FIG. 17, discharge cover 414, being similar to discharge cover 614, has a generally cylindrical shape and includes an annular sidewall 415. Discharge cover 414 also includes a spout 417 configured to act as an environmental guard and tamper deterrent for surrounded flexible nozzle 16.

The interior of discharge cover 414 may be curved to align adjacent the outer curved surface of milling device 418. Milling device 418 includes a front rotating grinder 419 and a rear fixed grinder 421.

Outlet adapter 410 also includes a gasket 422 fastened to the rear of discharge cover 414 via fasteners 426. Gasket 422 provides improved sealing of discharge cover 414 against rear fixed grinder 421. In assembly, discharge cover 414 with gasket 422 is aligned against a front housing 428, (may be secured by clamp bar 636, similar to discharge cover 614), and then post 440 is fastened to front housing 428 through receptor 444. Post 440 and fasteners 426 are configured to allow for installation both manually and by use of tools.

Figure 18A:
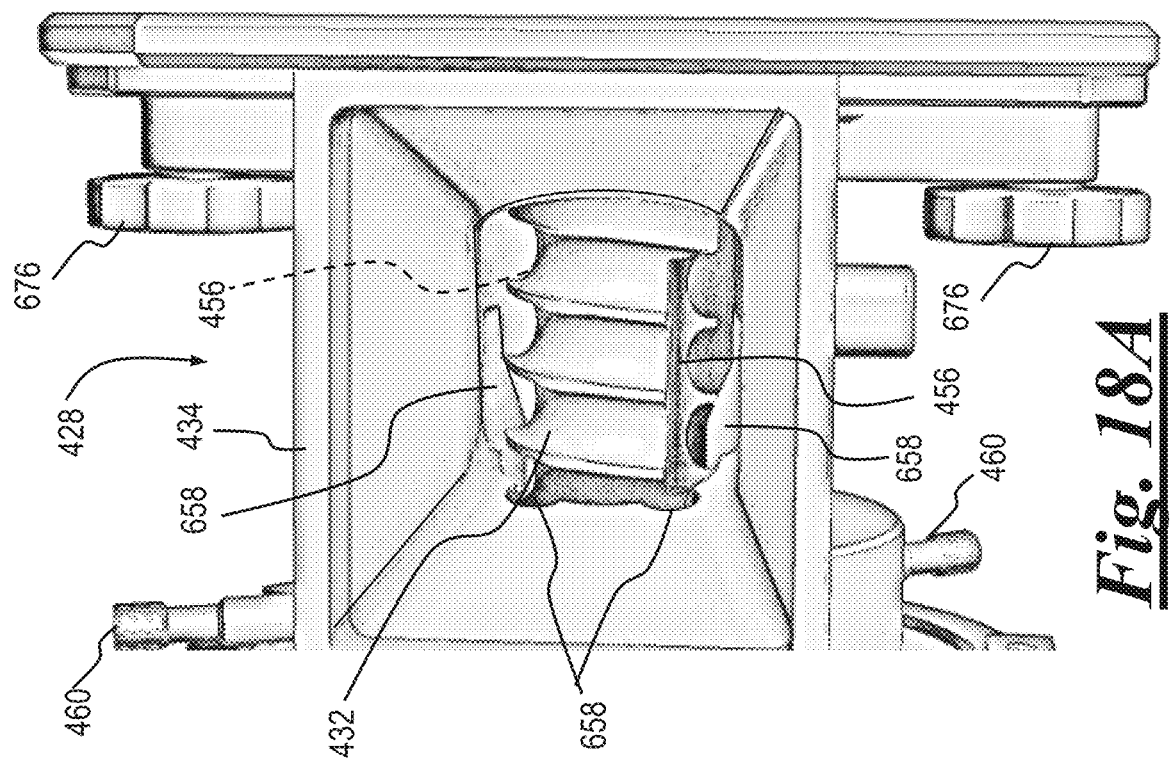
FIG. 18A is a partial top plan view of the assembled transport device inside the front housing of FIG. 17.
Figure 18B:
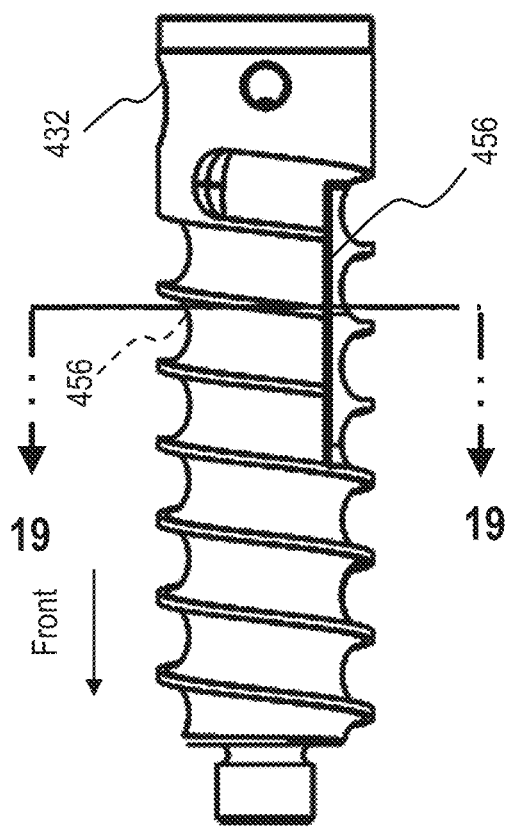
FIG. 18B is a top plan view of the auger/transport device of FIG. 17.
Figure 19:
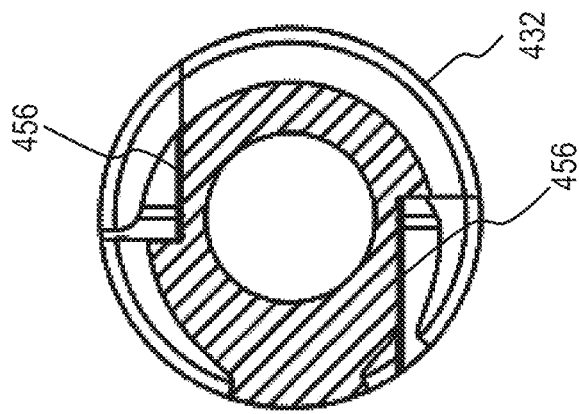
FIG. 19 is a rear view in section of the transport device of FIG. 18.

Now referring to FIGS. 18A, 18B and 19, transport device 432 is similar to transport device 32, except for including a hollow bore portion 454, and having two opposing cutouts 456 disposed at approximately 180 degrees out of phase, relative to each other. Cutouts 456 are aligned below the opening of a chute inlet 434.

Figure 20:
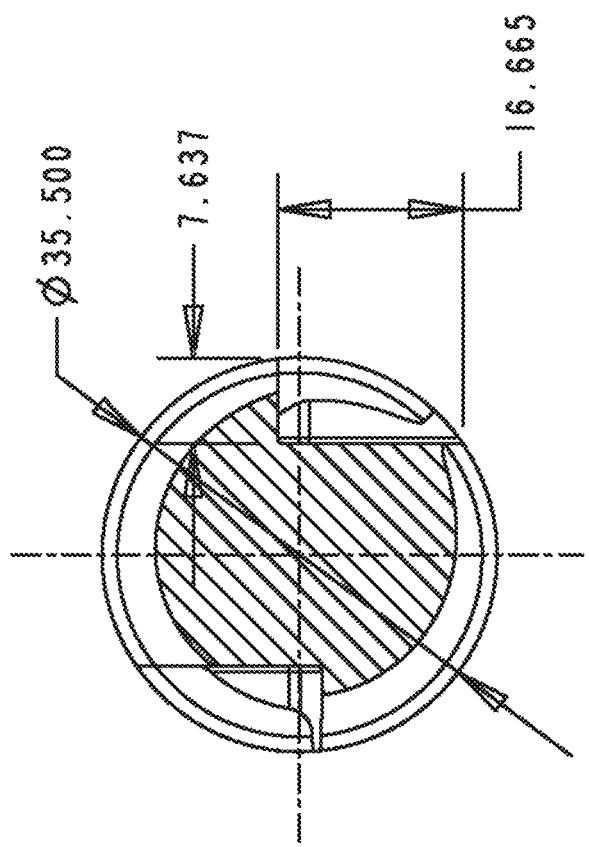
FIG. 20 is a rear view in section of a transport device according to another embodiment of the present invention.

Referring to FIG. 20, in some embodiments, transport device 432 is solid, and does not include hollow bore portion 454. In one embodiment, transport device 432 is formed with an outer diameter of about 35.5 mm, and cutouts 456 are formed with a depth of about 7.637 mm and a width of about 16.665 mm.

Figure 21:
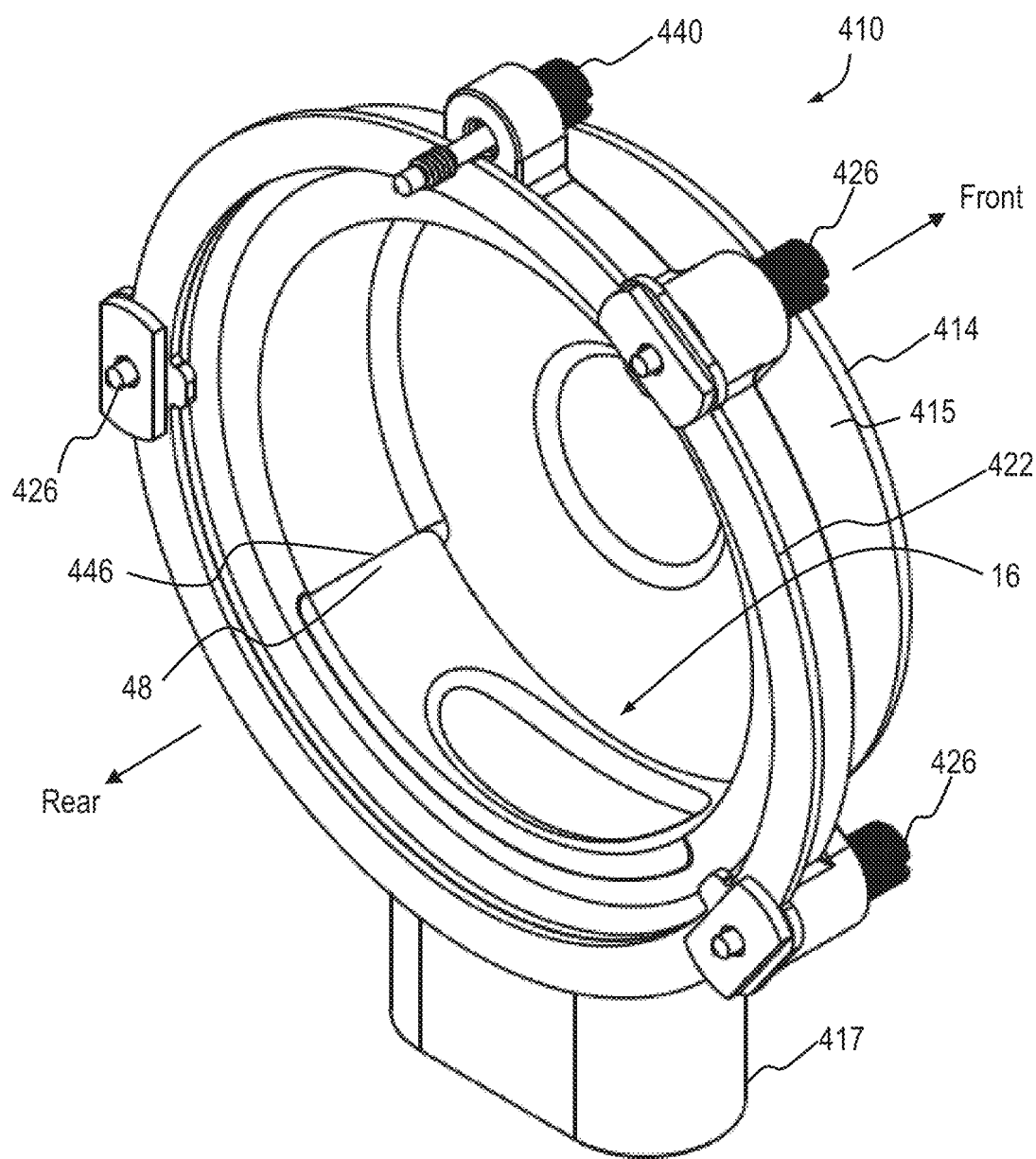
FIG. 21 is a rear perspective view of the outlet adapter of FIG. 17 with the nozzle assembled inside the discharge cover.
Figure 22:
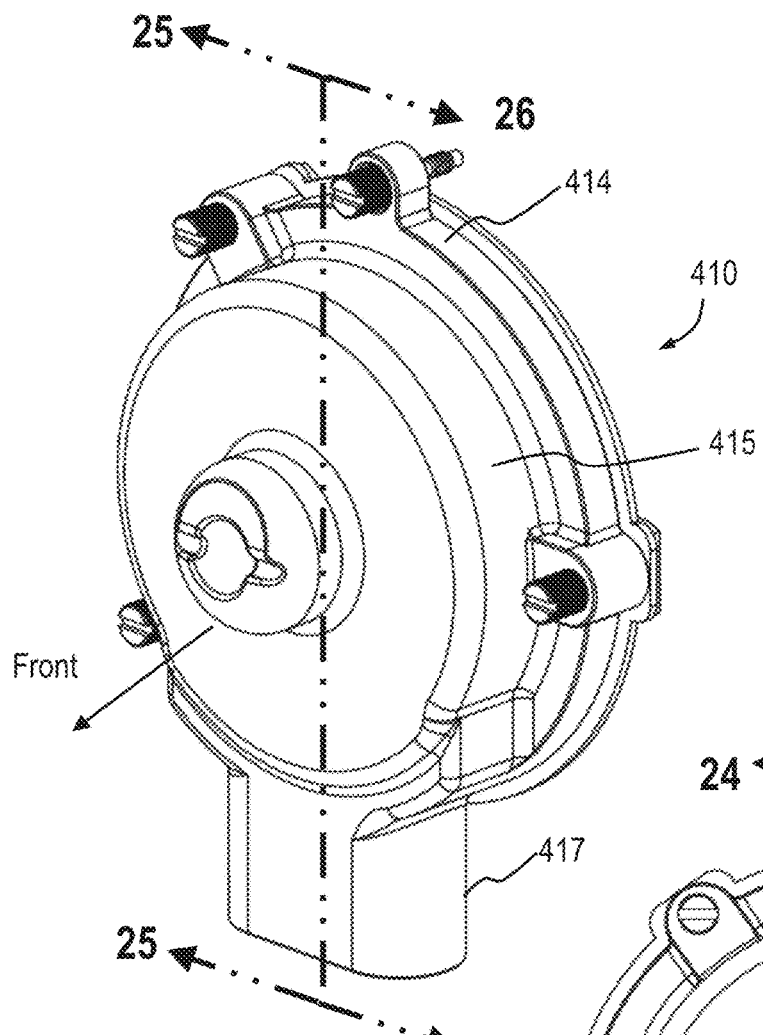
FIG. 22 is a front perspective view of the outlet adapter of FIG. 21.
Figure 23:
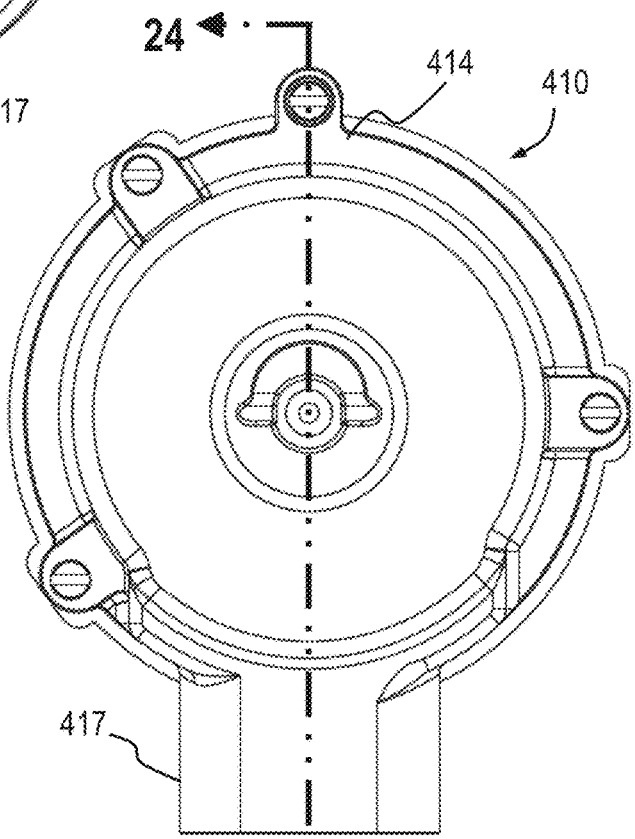
FIG. 23 is a front view of the outlet adapter of FIG. 21.
Figure 24:
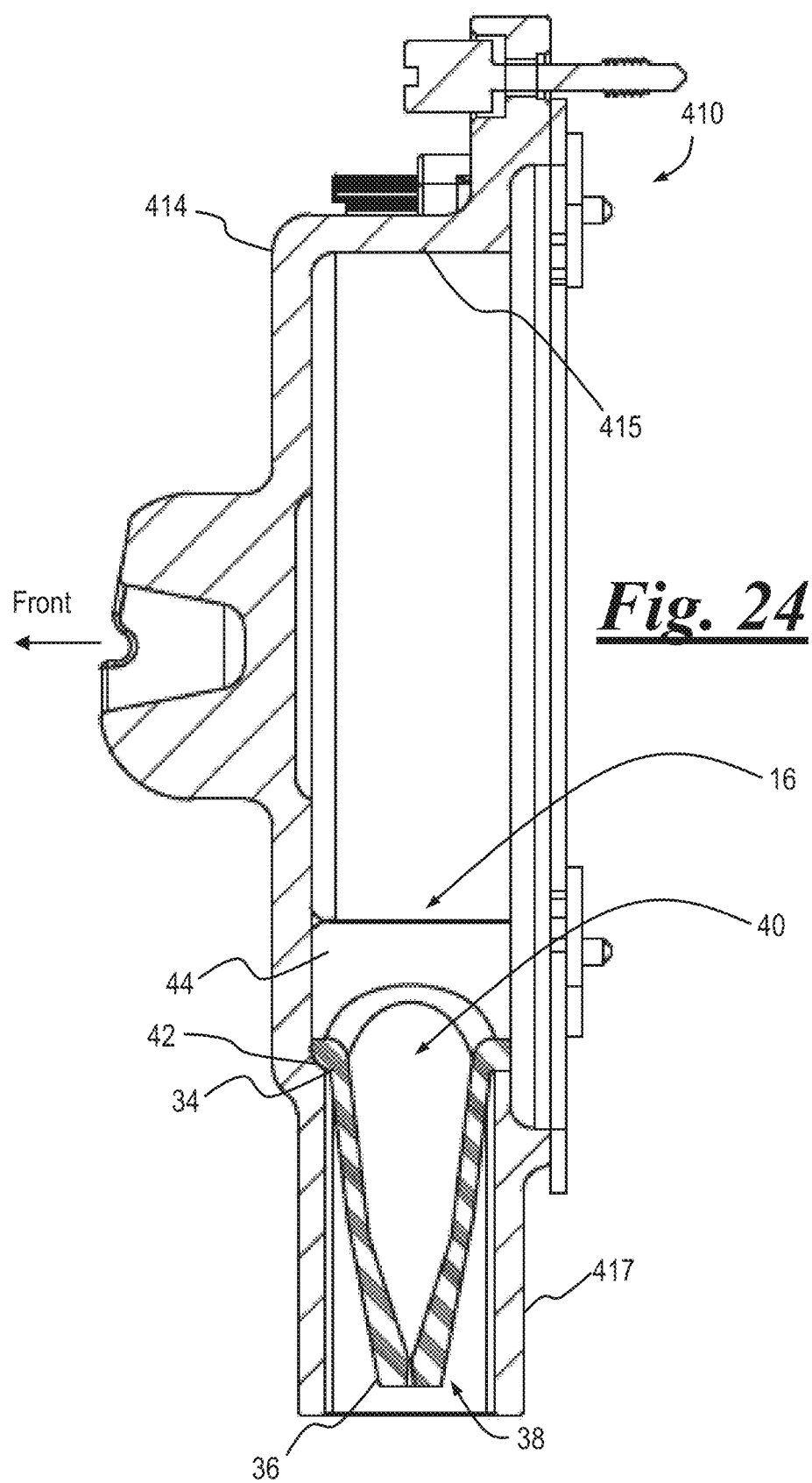
FIG. 24 is a short side view in section of the outlet adapter of FIG. 21.
Figure 25:
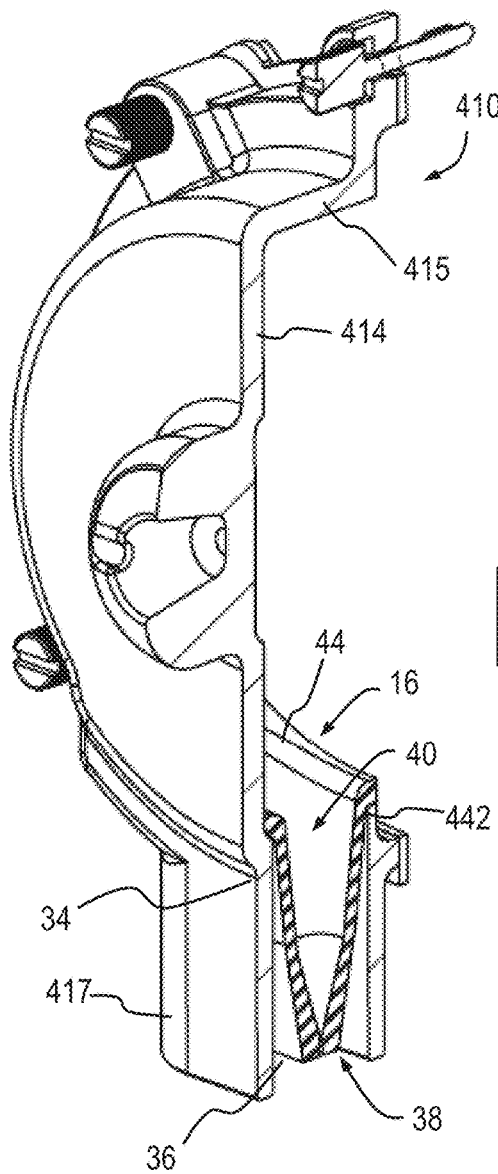
FIG. 25 is a right side perspective view in section of the outlet adapter of FIG. 21.
Figure 26:
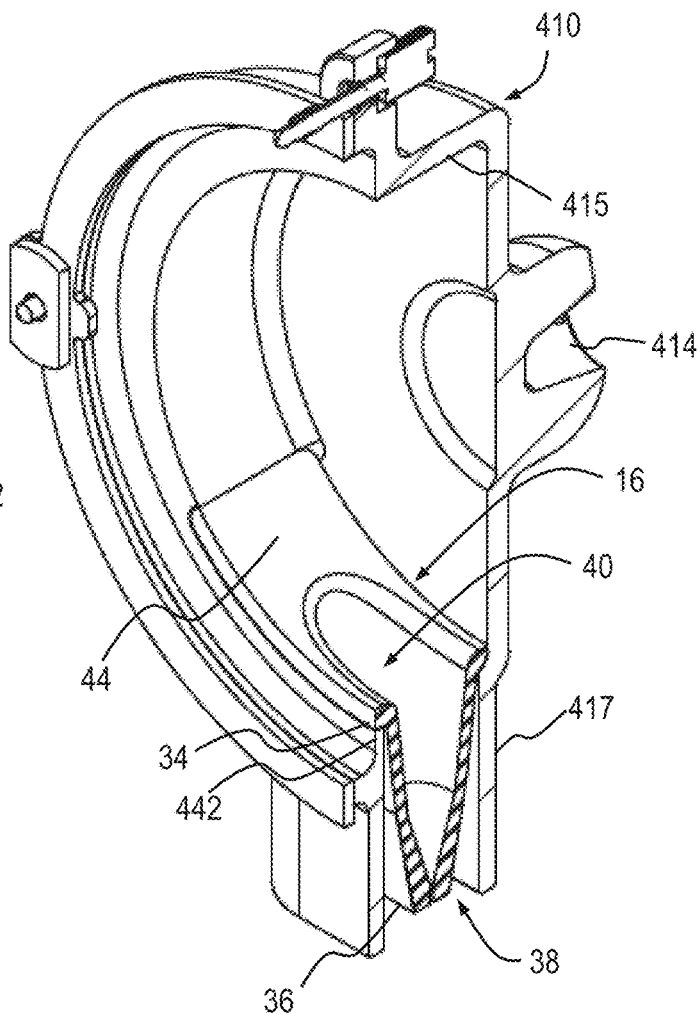
FIG. 26 is a left side perspective view in section of the outlet adapter of FIG. 21.
Figure 27:
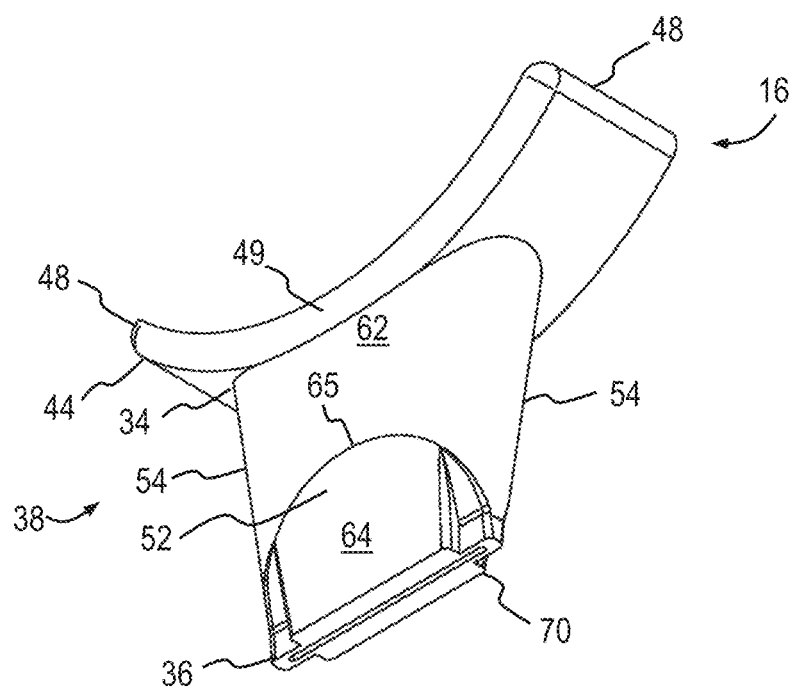
FIG. 27 is a bottom front perspective view of the flexible nozzle of FIG. 17.
Figure 28:
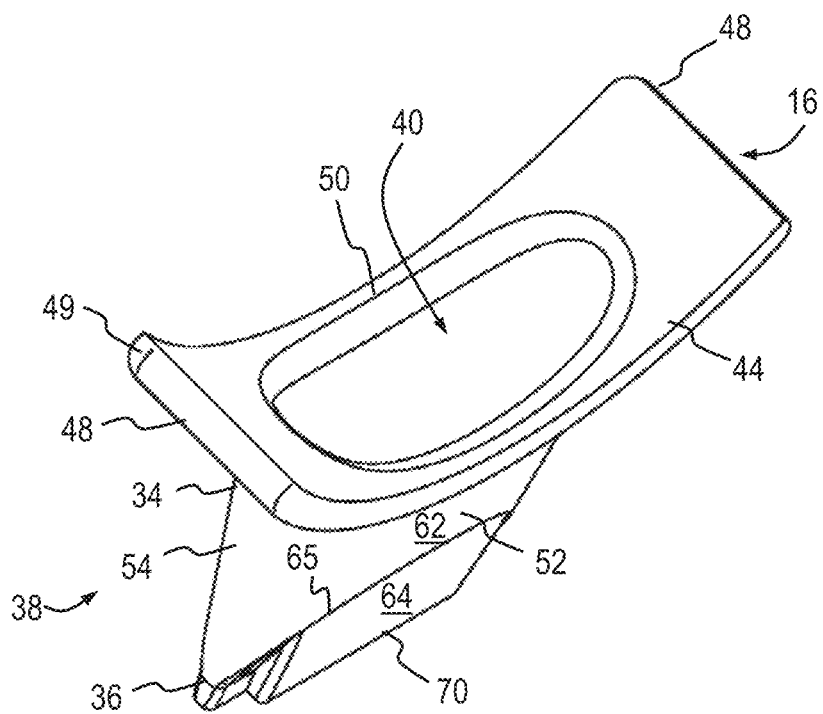
FIG. 28 is a top rear perspective view of the flexible nozzle of FIG. 27.
Figure 29:
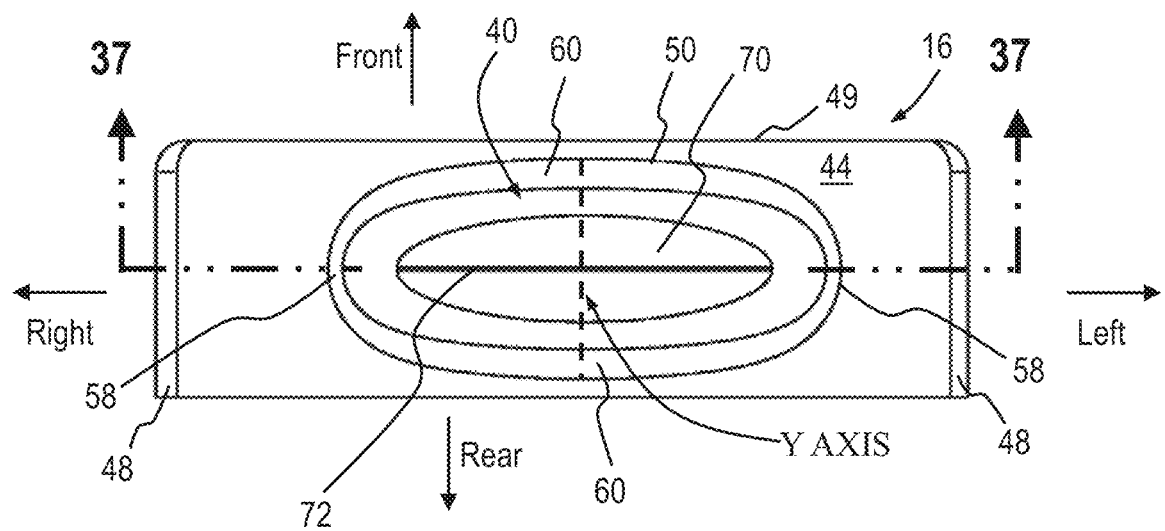
FIG. 29 is a top plan view of the flexible nozzle of FIG. 28.

Now referring to FIGS. 21-26, spout 417 extends from the bottom of annular sidewall 415, and encloses all of flexible nozzle 16, except the bottom outlet. Spout 417 may be integral or ancillary to outlet adapter 410. Referring to FIGS. 24-26, nozzle 16 includes a proximal end 34, a distal end 36. A valve 38 with a hollow interior passage 40 is formed in the nozzle. Nozzle 16 is coupled at the proximal end 34 to an aperture 442 in annular sidewall 415 of discharge cover 414. Nozzle 16 includes a mounting flange 44 at the proximal end 34 configured to fit against the concave curved interior surface of discharge cover 414. As seen in FIG. 21, discharge cover 414 may include a shoulder 446 configured to abut the outer edges 48 of mounting flange 44. As best seen in FIGS. 34 and 35, a perimeter edge 49 of flange 44 may include radius curved portions configured to seal against concave curved interior edge portions of discharge cover 414.

Valve 38 is biased in a normally closed position and flexes to an open position due to a pressure exerted by the discharge of viscous food paste 22 as it is forced downstream through interior passage 40, and returns to the normally closed position upon flow cessation. Valve 38 is configured with interior geometry features that pinch or chop against elongated stream 24 as the valve returns to the closed position, effectively slicing through, pinching, or breaking apart the elongated stream. Pinching elongated stream 24 within valve 38 reduces the amount of paste residue attached to the external face of the bottom of the valve after the valve returns to the closed position.

In some embodiments, the properties of viscous food paste 22 allow for an alternative flexible nozzle to be utilized. Such flexible nozzle has a discharge opening that also enlarges, or deforms, due to product stream pressurization, and returns to the closed position upon flow cessation. The severing of elongated stream 24 leaves substantially no paste residue attached to the external face of the bottom of the valve after the stream flow is de-pressurized.

In some embodiments, the properties of viscous food paste 22 allow for an alternative rigid or semi-rigid nozzle to be utilized. Such properties of viscous food paste 22 inherently result in a clean drop or severing of elongated stream 24 due to forces of gravity once the supply flow is depressurized. Such natural severing of elongated stream 24 leaves substantially no paste residue attached to the external face of the bottom of the valve after the stream flow is de-pressurized. In some embodiments, such clean dropping viscous food paste 22 may be dispensed with just the discharge cover in place, without any nozzle inserted. In some embodiments, the discharge cover does not utilize spout 417, and a separate, plastic sneeze guard (not shown) is supported in front of the discharge of valve 38.

In some embodiments, a suitable biasing device, such as a pinch roller set (not shown) is used to assist flexible nozzle 16 in returning to its original, closed position after the stream flow is de-pressurized. In operation, once the stream flow is de-pressurized, the pinch roller set is activated adjacent to proximal end 34 of valve 38. The rollers of the pinch roller set are urged closer together to slightly compress valve 38 as the rollers are moved downwardly towards the distal end 36. As valve 38 returns to the closed position, elongated stream 24 is severed, and leaves substantially no paste residue attached to the external face of the bottom of the valve. The pinch roller set is thereafter returned to a starting position. The operation of the pinch rollers can be achieved by various methods, including full or partial automation.

Referring to FIGS. 27-40, mounting flange 44 includes an opening 50 at proximal end 34 of interior passage 40. Opening 50 has an ovoid shape and is configured to receive viscous food paste 22. Interior passage 40 tapers asymmetrically in two dimensions (see FIGS. 30, 33-35) slightly from opening 50 downstream toward distal end 36.

Figure 37:
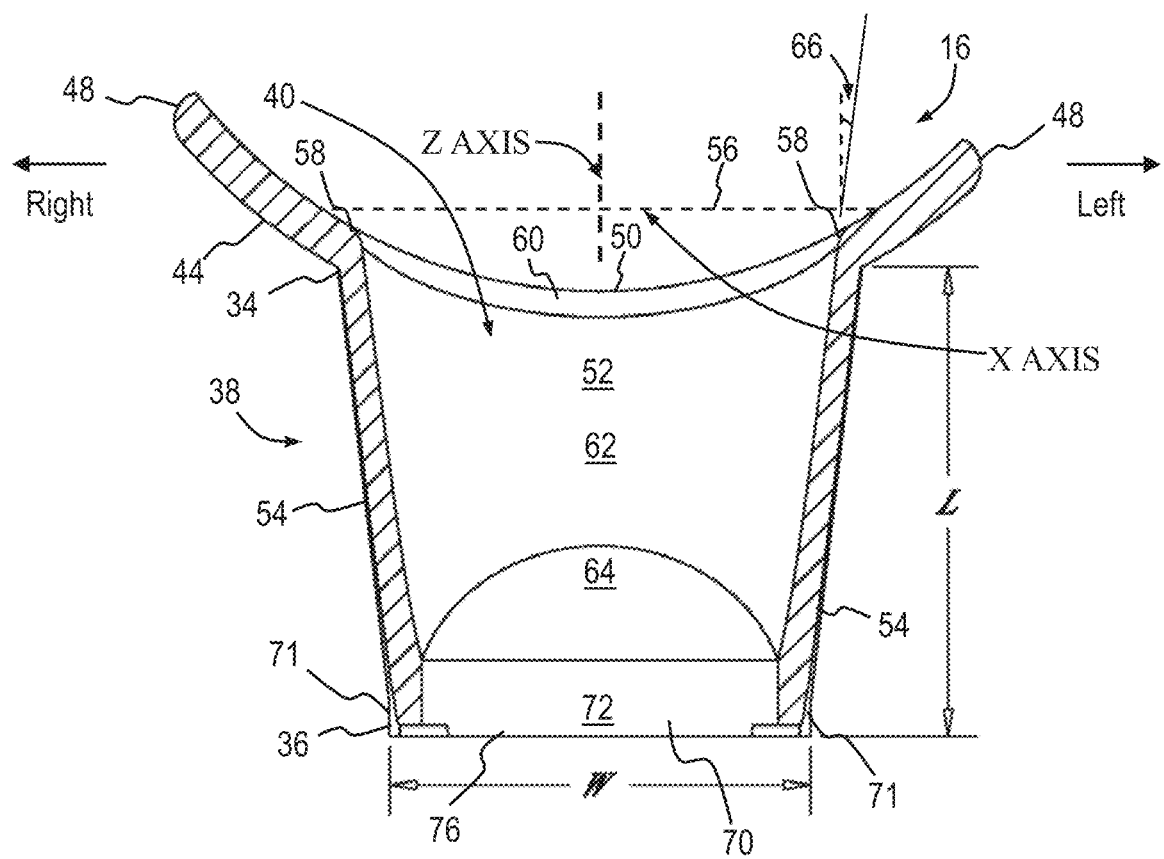
FIG. 37 is a long side view in section of the flexible nozzle of FIG. 28.
Figure 38:
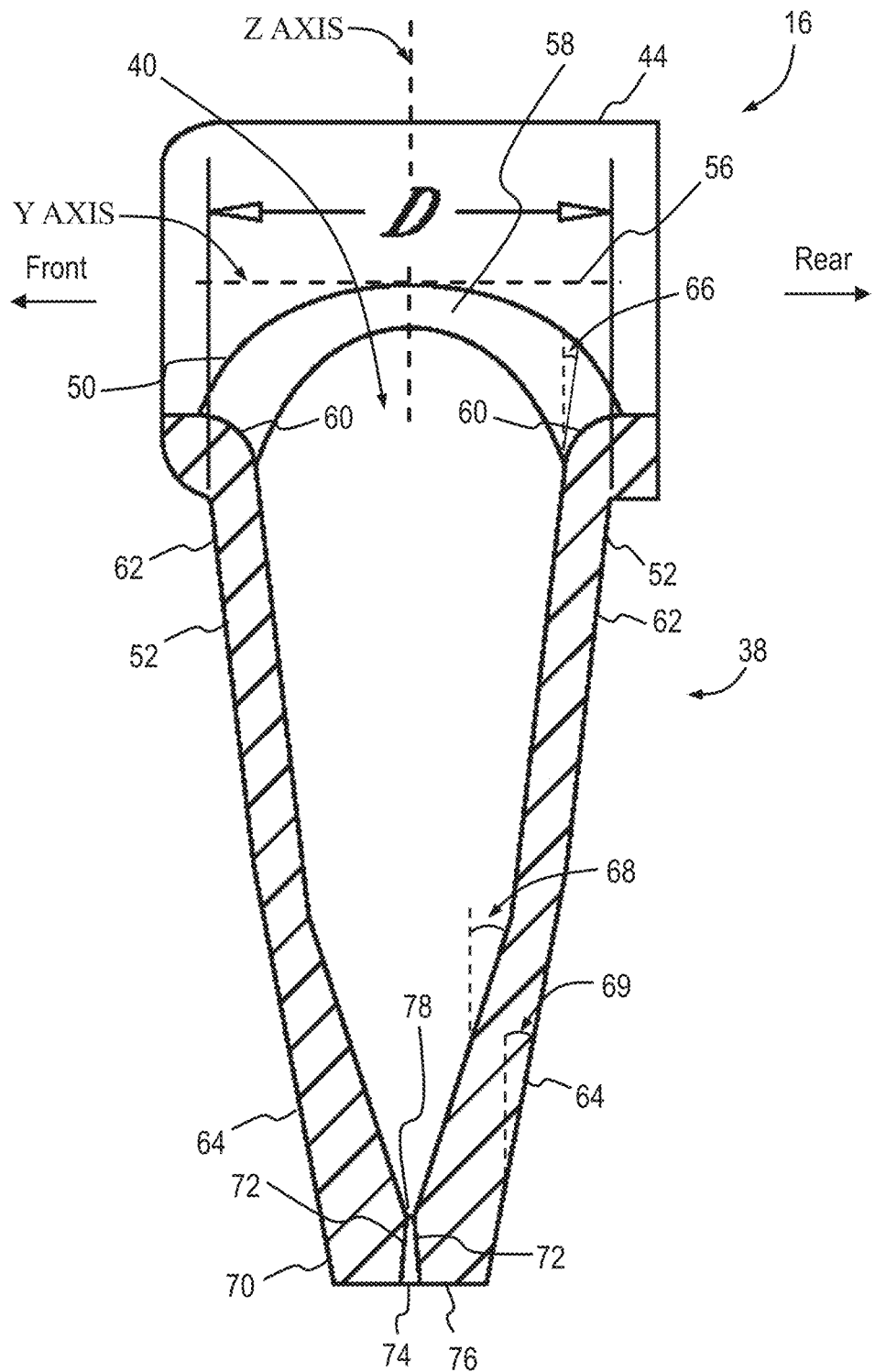
FIG. 38 is a short side view in section of the flexible nozzle of FIG. 28 prior to the flow of viscous food product.
Figures 39, 40:
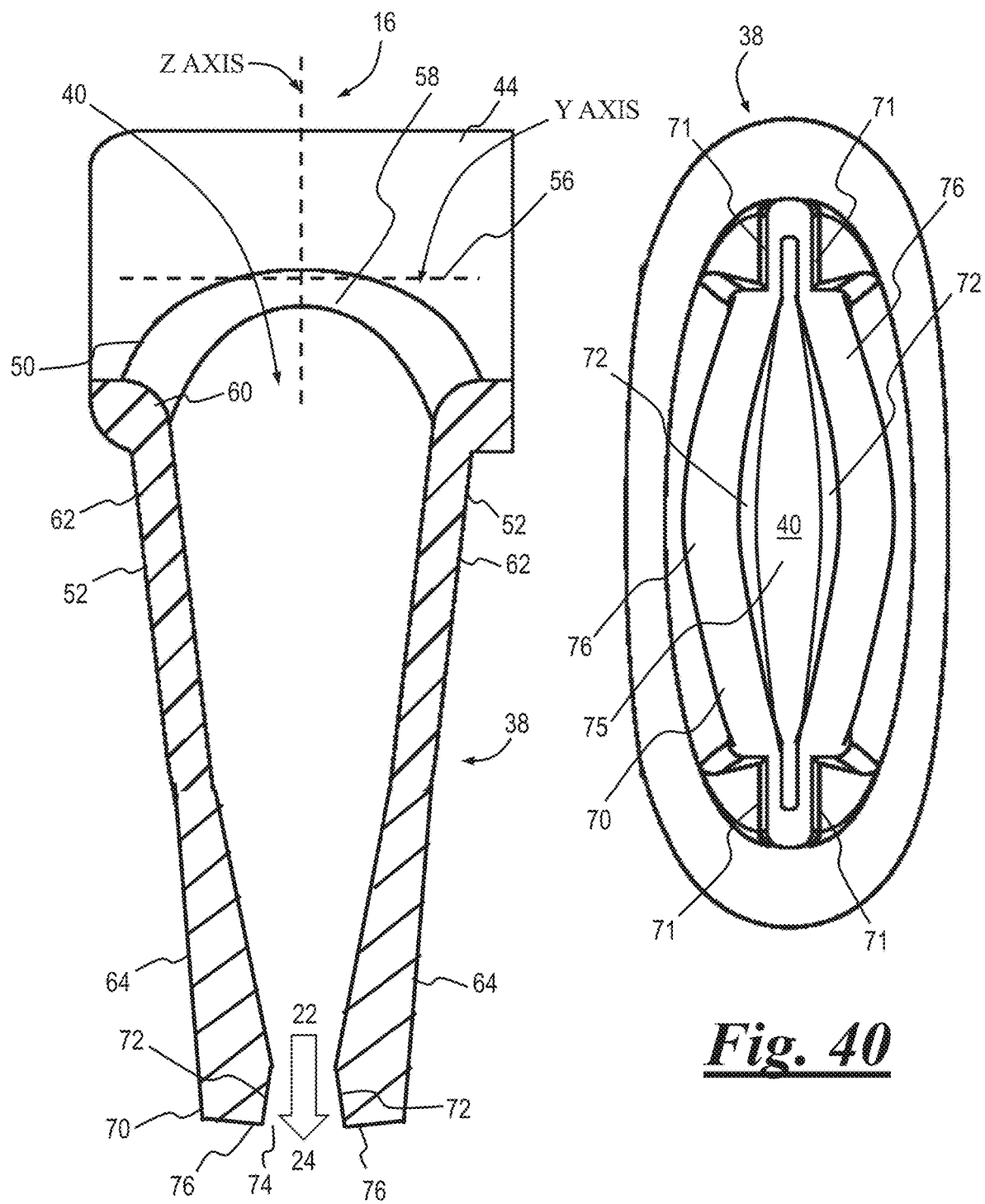
FIG. 39 is the flexible nozzle of FIG. 38 deformed during the flow of viscous food product.
FIG. 40 a bottom view of the deformed valve of the nozzle of FIG. 39.
Figure 41:
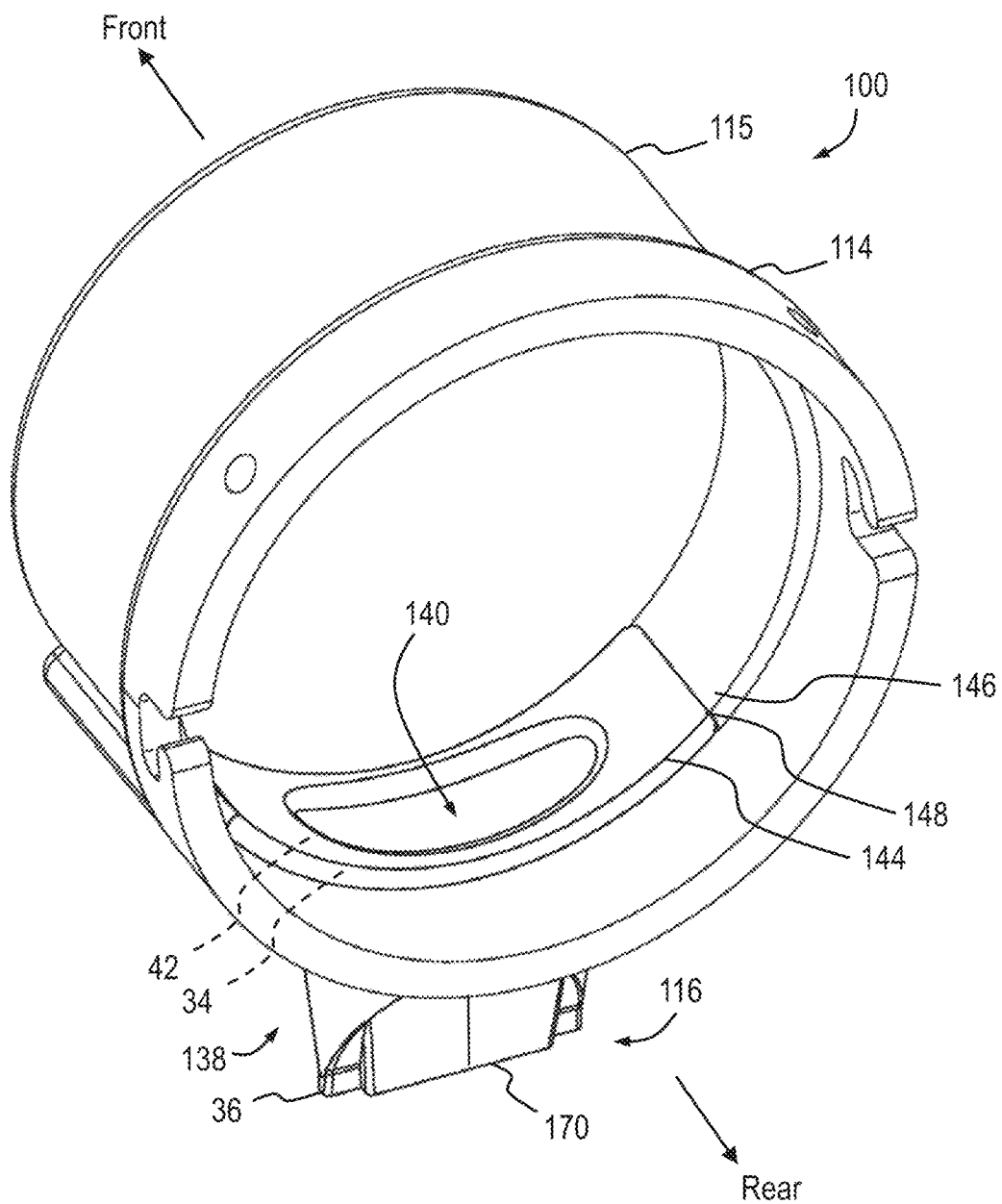
FIG. 41 is a rear perspective view of an outlet adapter according to another embodiment of the present invention.
Figure 42:
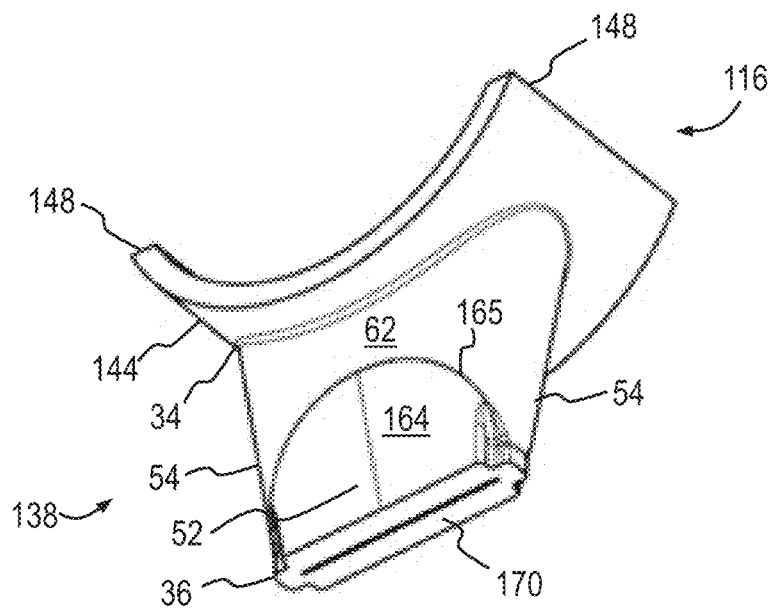
FIG. 42 is a bottom perspective view of the flexible nozzle of FIG. 18.

Valve 38 includes a pair of opposing flap walls 52 joined by a pair of opposing side walls 54, the flap walls and side walls together forming continuous interior passage 40. Referring to FIG. 37, valve 38 has a side exterior linear dimension length "L" and a bottom exterior linear dimension width "W". In one embodiment, "L" and "W" are from about 1.65 inches to about 2.2 inches, and preferably "L" is about 2.0 inches and "W" is about 1.65 inches. Referring to FIG. 38, valve 38 has an exterior linear dimension depth "D" of about 0.75 inches to about 1.25 inches, and preferably about 0.85 inches.

Figure 30:
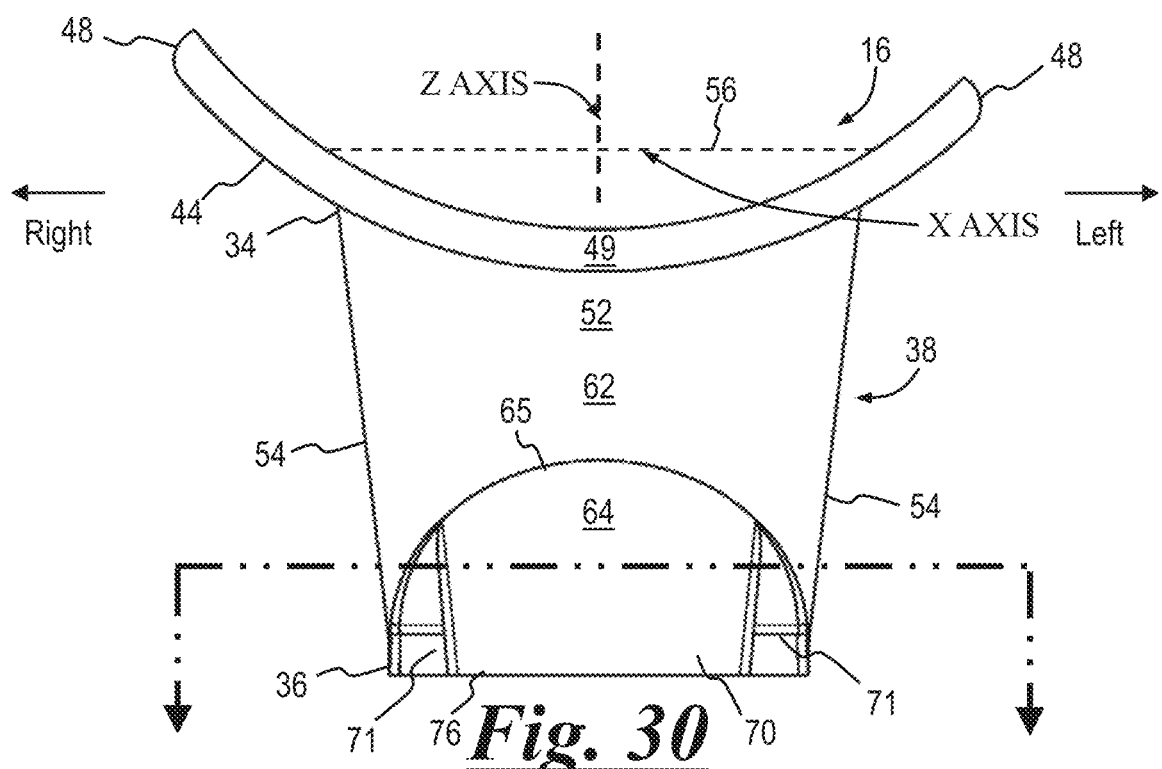
FIG. 30 is a rear elevation view of the flexible nozzle of FIG. 28.
Figure 31:
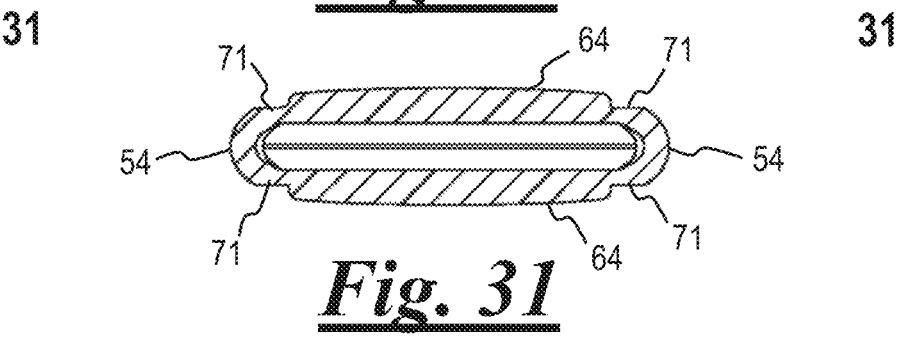
FIG. 31 is a horizontal section view of the flexible nozzle of FIG. 28.
Figure 32:
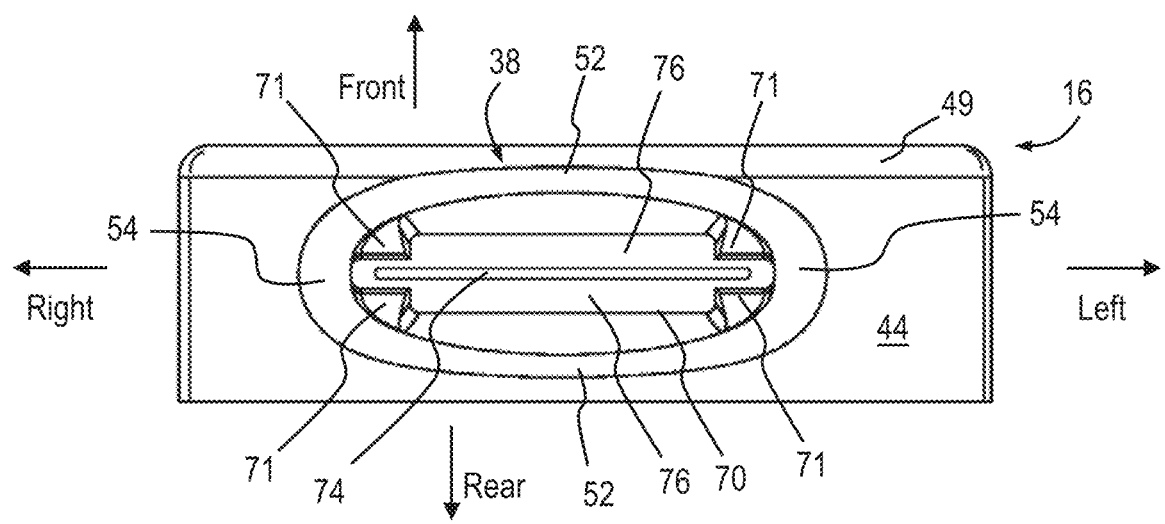
FIG. 32 is a bottom plan view of the flexible nozzle of FIG. 28.
Figure 33:
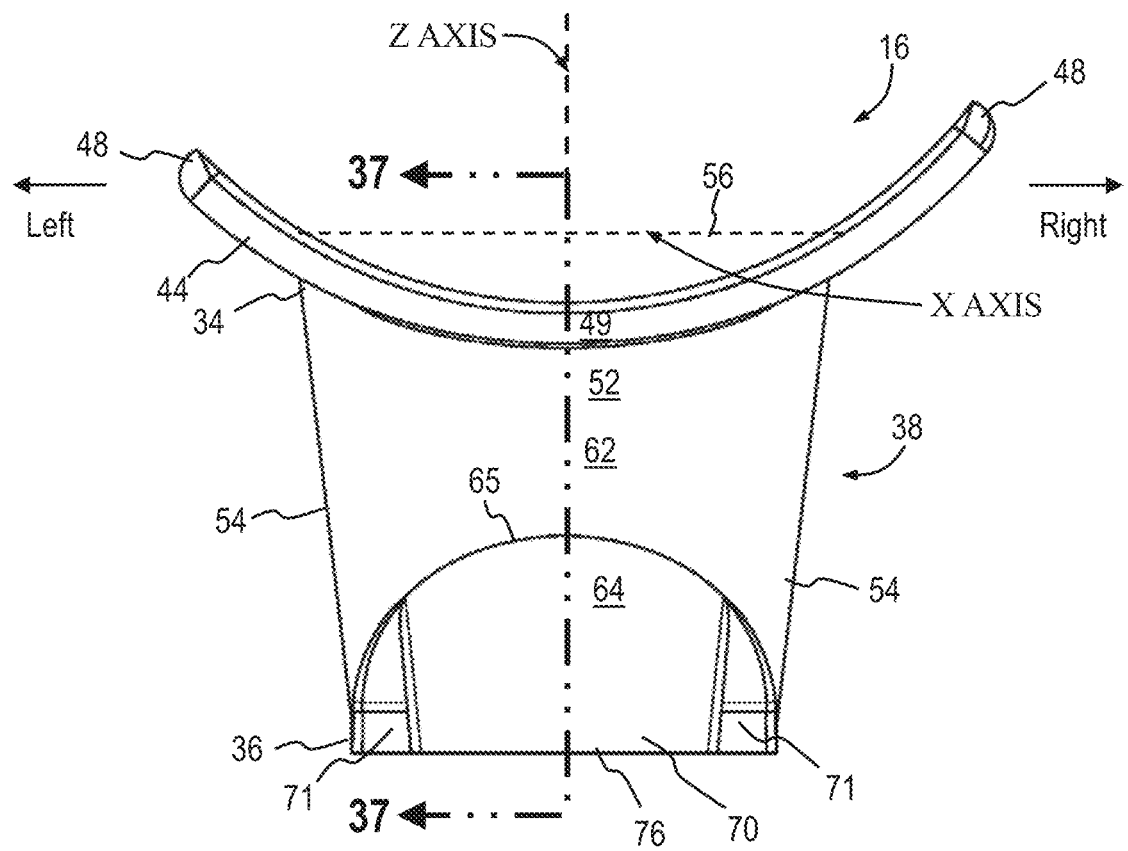
FIG. 33 is a front elevation view of the flexible nozzle of FIG. 28.
Figure 36:
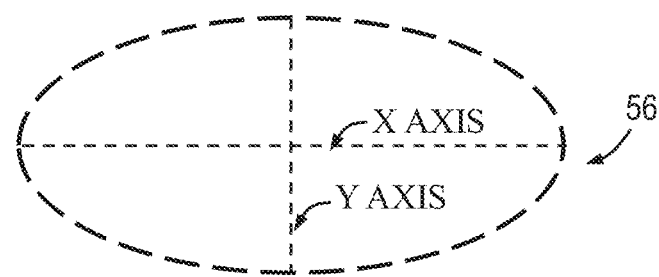
FIG. 36 is a top plan view of a reference planar oval relative to the flexible nozzle of FIG. 28.

Referring to FIGS. 30, 33 and 36, a reference planar oval 56 is visualized as located above opening 50, in the X-Y plane; the reference planar oval having a central X axis, Y axis and perpendicular Z axis. Opening 50 has a generally concave curvature about the Y axis configured to match the curvature of annular sidewall 415 of discharge cover 414. To reduce pressure drop of the pressurized supply flow of viscous food paste 22 through opening 50, the interior transition from flange 44 to side walls 54 and flap walls 52 is formed in a radius curvature. Referring to FIGS. 29-39, the transition from flange 44 to side walls 54 has a generally convex curvature 58 relative to the Z axis and the transition from the flange to flap walls 52 has a generally convex curvature 60 relative to the Z axis.

Valve 38 is biased in a normally closed position (see FIG. 38) and flexes to an open position (see FIG. 39) due to a pressure exerted by the discharge of viscous food paste 22. Valve 38 has a generally duckbill shape, and includes a sheath portion 62 and a flexible portion 64. Sheath portion 62 is located on side walls 54 and on the upper portion of flap walls 52. On flap walls 52, flexible portion 64 forms a curved interface 65 with sheath portion 62. Sheath portion 62 is configured with a lesser interior taper angle 66 from about 7 degrees to about 8 degrees relative to the Z axis. Flexible portion 64 is located on flap walls 52 and is configured with a greater interior taper angle 68. In one embodiment, the wall thickness of flexible portion 64 increases as it tapers towards port 70. At the section center cut of FIG. 38, the greater interior taper angle 68 is about 18 degrees and a greater exterior taper angle 69 is from about 11 degrees to about 14 degrees, relative to the Z axis. Flexible portion 64 is configured to be biased in a normally closed position and flexes outward slightly toward the exterior as the pressurized supply flow of viscous food paste 22 is forced downstream through interior passage 40 (see FIG. 39).

Interior passage 40 is defined by opening 50 and the proximal ends 34 of flap walls 52, having a generally ovoid cross-section about the Z axis, that gradually decreases in cross sectional area downwardly (along the Z axis) towards a normally closed port 70 of flexible nozzle 16 at distal end 36. Port 70 is configured for operation from the biased normally closed position to the open position for discharge of viscous food paste 22 in the elongated stream 24. Elongated stream 24 may be captured by the user within a container below port 70 (see FIG. 15).

Port 70 is configured such that the force from the pressurized supply flow of viscous food paste 22 urges the port open and once the supply flow is depressurized and the force ceases, the removal of the force causes the port to return to the normally closed position (FIG. 38). Port 70 will move to the open position when the product processing pressure of the supply flow of viscous food paste 22 reaches a predetermined valve threshold pressure, and will return to the closed position when the product processing pressure falls below the valve threshold pressure.

Each flexible portion 64 includes opposing pairs of tapered stiffening portions 71 adjacent to side walls 54. At each side wall 54 adjacent stiffening portions 71 taken together are configured to be from about two-thirds to about one-half of the width of port 70 at distal end 36, and are configured to assist in biasing the port into the closed position.

Port 70 includes a pair of opposing gates 72 at the distal end 36 of the interior surfaces of flap walls 52. In the closed position, gates 72 have the appearance of a substantially closed elongated slit. As gates 72 are forced open by the pressurized supply flow of viscous food paste 22 to form an outlet 74. As the slit opens, the middle portion thereof opens relatively more than the end portions to form a bulbous middle portion 75. In other words, gates 72 each deform in a generally bell-like, somewhat concave curvature, to form an ovaloid shaped middle portion 75 of outlet 74 (see FIG. 40).

Valve 38 of nozzle 16 is configured to reduce the amount of paste residue attached to external face 76 by effectively severing the elongated stream 24 without causing excessive pressure drop when the valve is in the open position.

Referring to FIG. 38, gates 72 are configured to be angled slightly relative to each other along the X axis from a pinch point 78 down towards a gap at outlet 74, and thus are biased to abut close together at the pinch point when port 70 is in the normally closed position. As such, gates 72 of port 70 are configured to pinch or chop against elongated stream 24 as the port returns to the closed position, effectively slicing through or breaking apart the elongated stream. The severed elongated stream 24 falls into the user's container below, thereby reducing the amount of residue viscous food paste 22 remaining attached to external face 76 of port 70.

Figure 43:
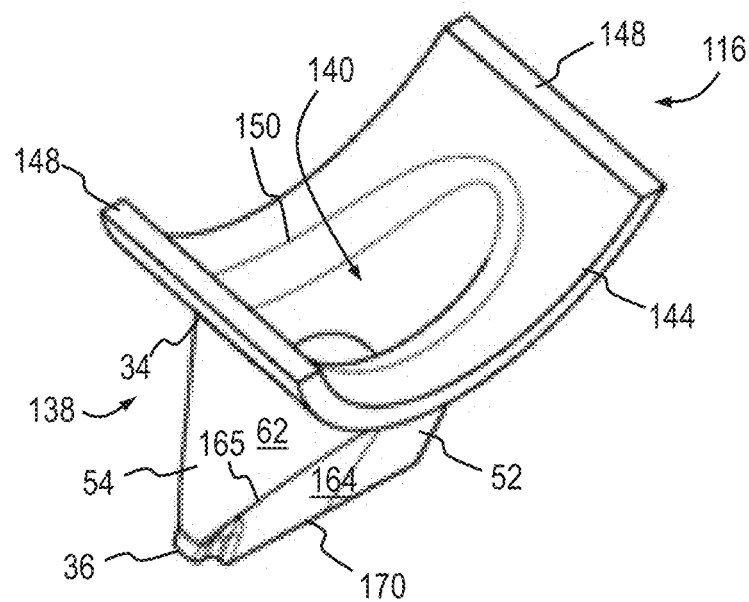
FIG. 43 is a top perspective view of the flexible nozzle of FIG. 18.
Figure 44:
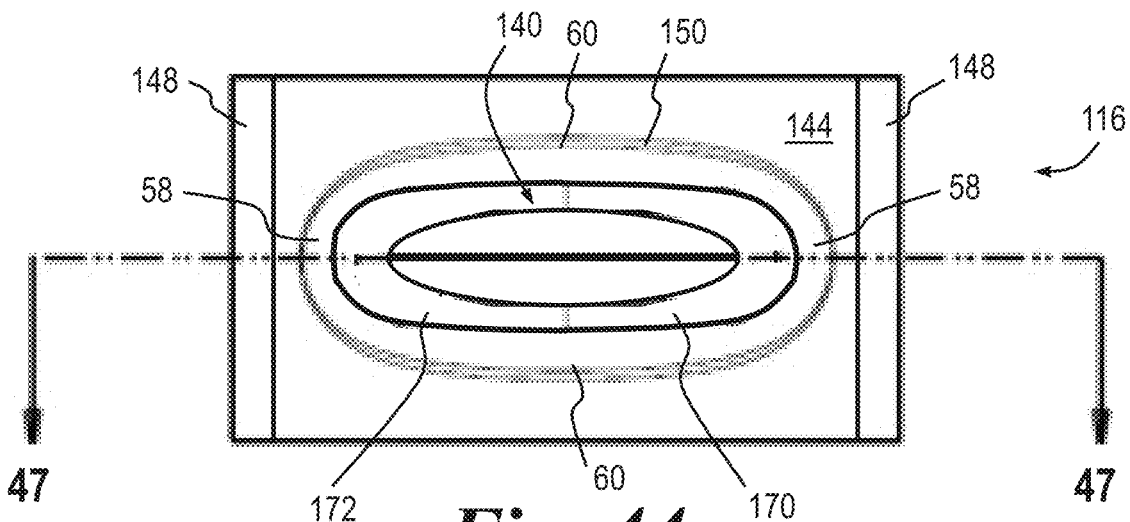
FIG. 44 is a top plan view of the flexible nozzle of FIG. 43.
Figure 45:
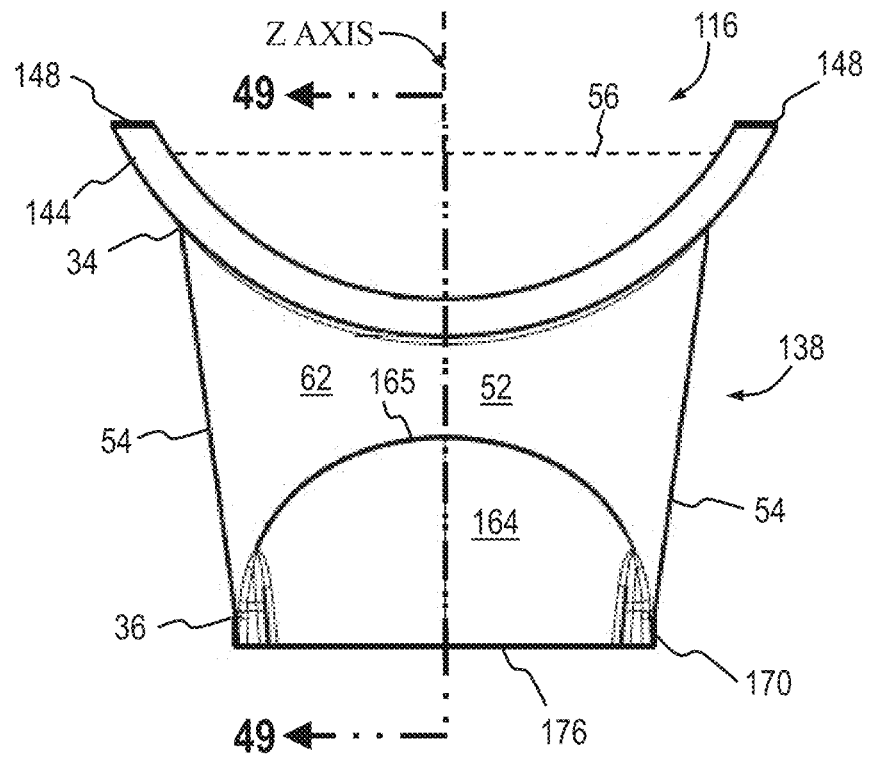
FIG. 45 is a front elevation view of the flexible nozzle of FIG. 43.
Figure 46:
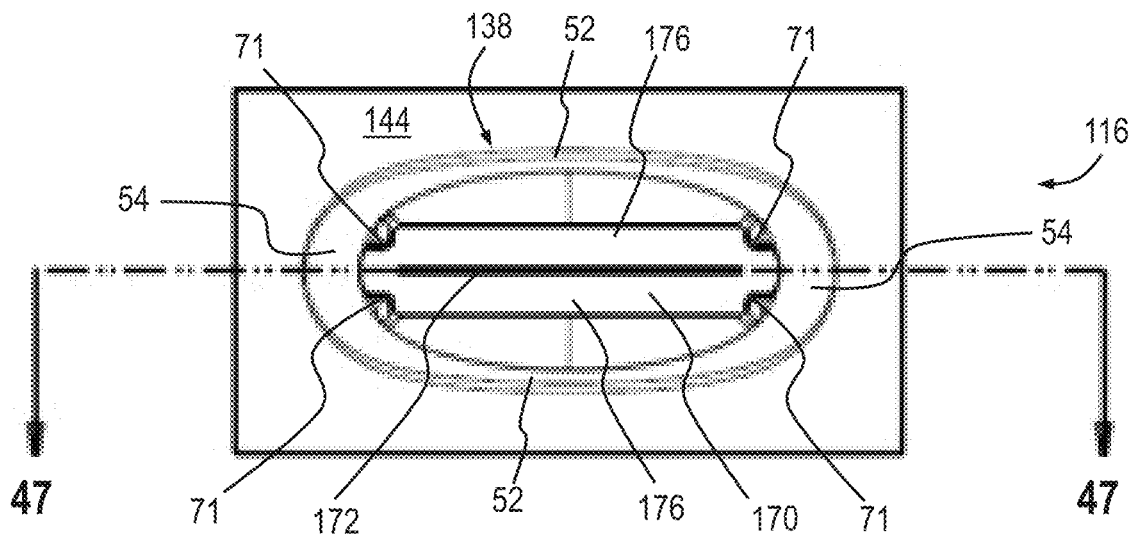
FIG. 46 is a bottom plan view of the flexible nozzle of FIG. 43.
Figure 47:
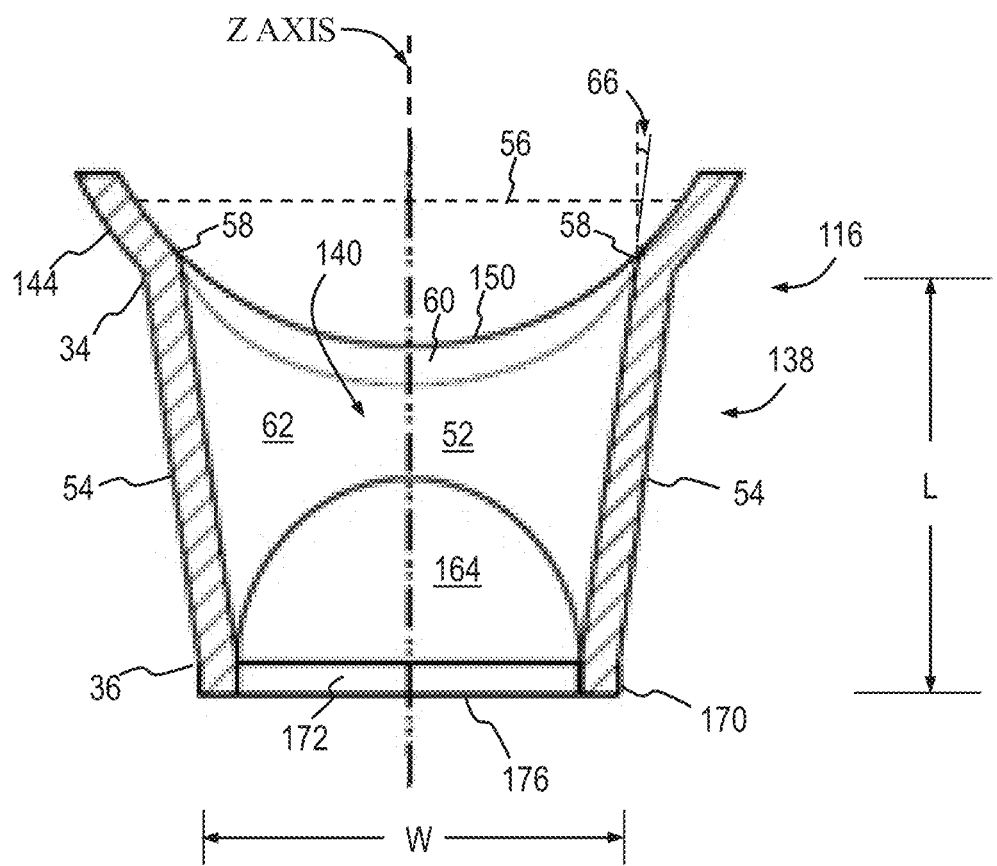
FIG. 47 is a long side view in section of the flexible nozzle of FIG. 43.
Figure 48:
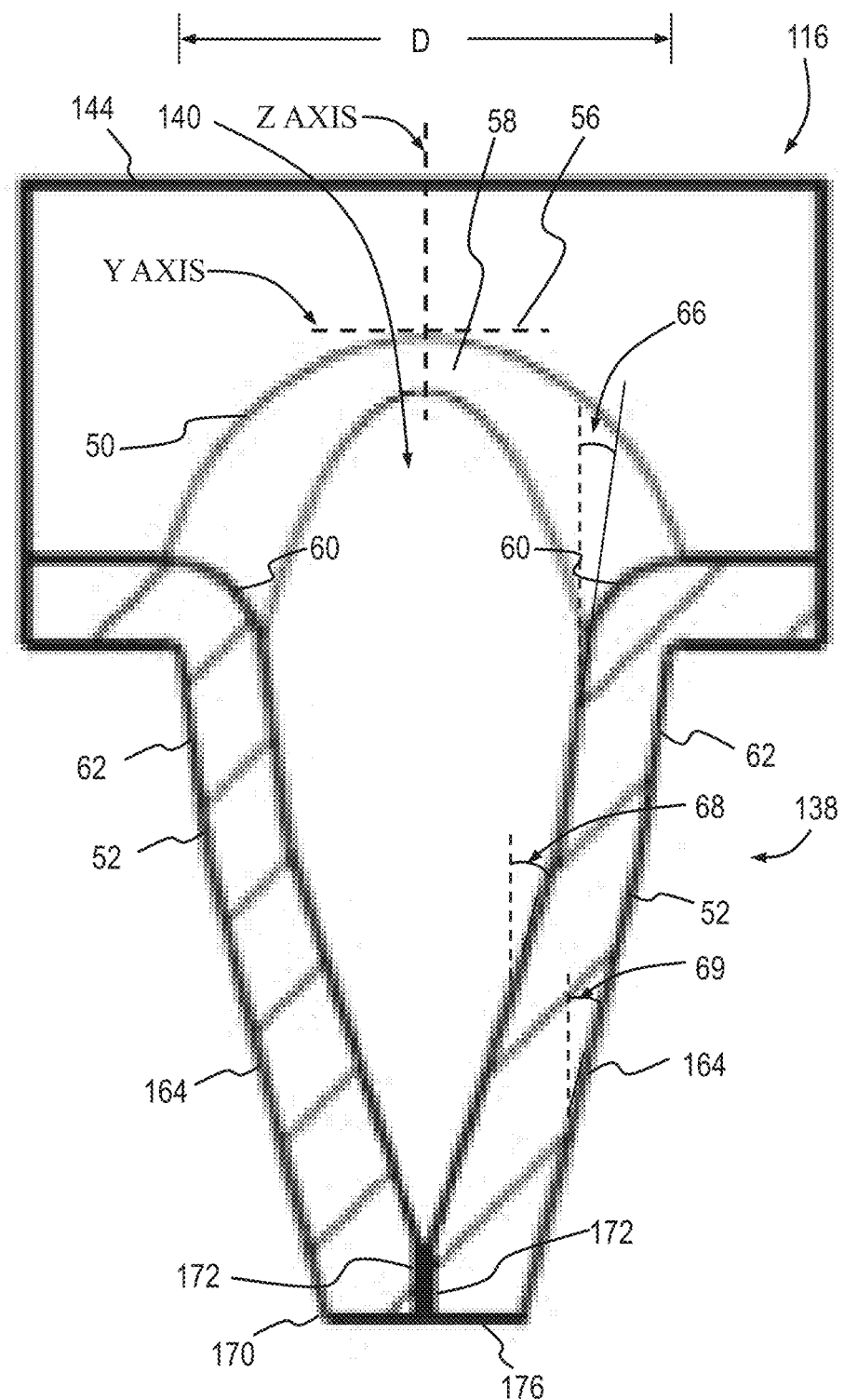
FIG. 48 is a short side view in section of the flexible nozzle of FIG. 43 prior to the flow of viscous food product.
Figures 49, 50:
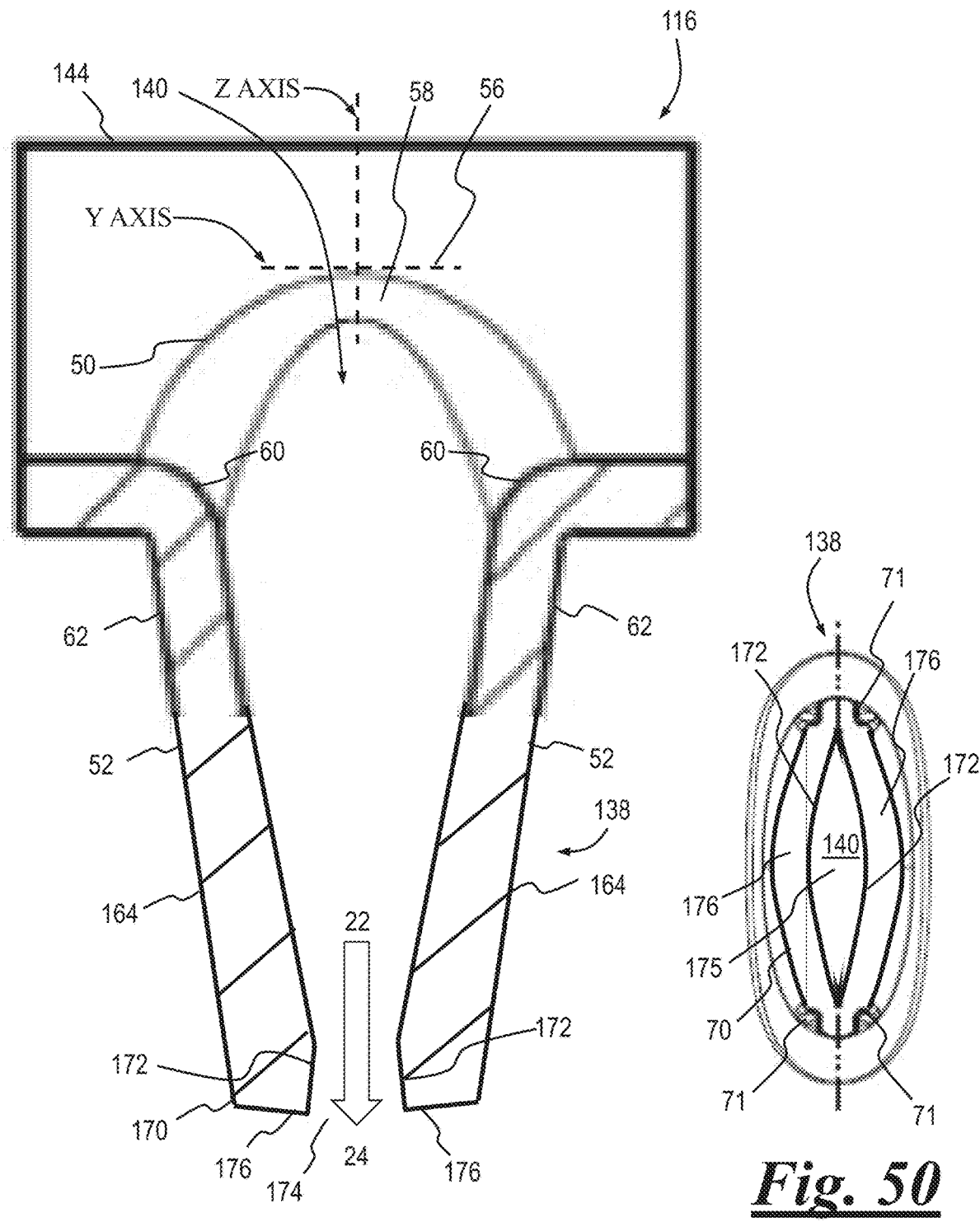
FIG. 49 is the flexible nozzle of FIG. 26 deformed during the flow of viscous food product.
FIG. 50 is a bottom view of the flexible nozzle of FIG. 43 deformed during the flow of viscous food product.

Now referring to FIGS. 41-50, in an alternative embodiment, an outlet adapter 100 includes a discharge cover 114 and a flexible nozzle 116. Nozzle 116 has many similar features to nozzle 16 described above (see FIGS. 27-40). Nozzle 116 is coupled at the proximal end 34 to an aperture 42 in annular sidewall 115 of discharge cover 114. Nozzle 116 include a valve 138 and a mounting flange 144 at the proximal end 34 configured to fit against the concave curved interior surface of discharge cover 114. Discharge cover 114 may include a shoulder 146 configured to abut the outer edges 148 of mounting flange 144. Referring to FIG. 43, mounting flange 144 includes an opening 150 at proximal end 34 of an interior passage 140 configured to receive viscous food paste 22.

Valve 138 is biased in a normally closed position (see FIG. 48) and flexes to an open position (see FIG. 49) due to a pressure exerted by the discharge of viscous food paste 22. Valve 138 has a generally duckbill shape, and includes sheath portion 62 and a flexible portion 164. On flap walls 52, flexible portion 164 forms a curved interface 165 with sheath portion 62.

Interior passage 140 is defined by opening 150 and the proximal ends 34 of flap walls 52, having a generally ovoid cross-section about the Z axis, that gradually decreases in cross sectional area downwardly (along the Z axis) towards a normally closed port 170 of flexible nozzle 116 at distal end 36. Port 170 is configured for operation from the biased normally closed position to the open position for discharge of viscous food paste 22 in the elongated stream 24.

Port 170 includes a pair of opposing gates 172 at the distal end 36 of the interior surfaces of flap walls 52. In the closed position, gates 172 have the appearance of a closed slit. As gates 172 are forced open by the pressurized supply flow of viscous food paste 22 to form an outlet 174. As the slit opens, the middle portion thereof opens relatively more than the end portions to form a bulbous middle portion 175. In other words, gates 172 each deform in a generally bell-like, somewhat concave curvature, to form an ovaloid shaped middle portion 175 of outlet 174 (see FIG. 50).

Gates 172 are configured to be substantially parallel, and are further configured to be biased to abut together when port 170 is in the normally closed position. As such, gates 172 of port 170 are configured to pinch or chop against elongated stream 24 as the port returns to the closed position, effectively slicing through or breaking apart the elongated stream. The severed elongated stream 24 falls into the user's container below, thereby reducing the amount of residue viscous food paste 22 remaining attached to an external face 176 of port 170.

Nozzles 16, 116 are made of a suitable flexible, elastomeric material, such as rubber, for example. Preferably, the rubber is a food grade suitable for use with various particulate food products 20. The nozzle material may be configured of a durometer hardness to match the type of product used for milling, and the type of viscous food paste 22 produced by the viscous food product grinding and dispensing system 12. The durometer hardness utilized is coordinated to allow the valves 38, 138 to deform and open when interior passages 40, 140 are pressurized above a predetermined level and to seal closed causing a reduced residue drip when depressurized. In one example, for use with peanuts to make nut butter, the durometer of the rubber used for the nozzle may be from about Shore 60A to about Shore 90A. The durometer may vary depending on the size of the nuts used, and the texture of nut butter desired (chunky, coarse or smooth). The desired dispense rate of elongated stream 24 is also taken into account with the selection of rubber durometer. In one embodiment, larger sized peanuts produced a rate of about 1.3 lbs/minute to about 1.4 lbs/minute. In another embodiment, smaller sized peanuts produced a rate of about 3.1 lbs/minute to about 3.6 lbs/minute. In one embodiment, flexible nozzle 116 is preferably made from Shore 80A rubber for use in peanut butter applications to produce a flow rate of about 1.5 to about 3.4 lbs/minute of peanut food paste. The Shore 80A flexible nozzle 116 produces a dispense rate from about 3.2 to 3.4 lbs/minute with smaller sized peanuts and from about 1.5 to 1.7 lbs/minute with larger sized peanuts.

Discharge covers 114, 414, 614 may be made from a suitable food grade metal, such as stainless steel for example. Flexible nozzles 16, 116 are easily inserted and removed for cleaning from aperture 42 in discharge covers 114, 414, 614. Various parts shown are interchangeable in different system embodiments. For example, transport device 432 may be used within front housing 628.

Although shown coupling with the annular sidewall 115, 415 of cylindrical discharge covers 114, 414, and having a generally U-shaped flanges 44, 144, valves 38, 138 may be used in other applications, such as inline in industrial food processing. Valves 38, 138 may be mounted inline in a square, cylindrical or rounded conduit, where the corresponding flange perimeter is square, circular, or rounded and configured to mate with the adjacent conduit structure. The viscous food product dispensed by valves 38, 138 may be any suitable food product, such as dough, jam or mayonnaise. The valves may also be utilized with other suitable viscous products such as caulk, adhesives or petroleum jelly.

While this invention has been shown and described with respect to detailed embodiments thereof, it will be understood by those skilled in the art that changes in form and detail thereof may be made without departing from the scope of the claims of the invention.

Citations to a number of references are made herein. The cited references are incorporated by reference herein in their entireties. In the event that there is an inconsistency between a definition of a term in the specification as compared to a definition of the term in a cited reference, the term should be interpreted based on the definition in the specification.

In the above description, certain terms have been used for brevity, clarity, and understanding. No unnecessary limitations are to be inferred therefrom beyond the requirement of the prior art because such terms are used for descriptive purposes and are intended to be broadly construed. The different systems and method steps described herein may be used alone or in combination with other systems and methods. It is to be expected that various equivalents, alternatives and modifications are possible within the scope of the appended claims.

The functional block diagrams, operational sequences, and flow diagrams provided in the Figures are representative of exemplary architectures, environments, and methodologies for performing novel aspects of the disclosure. While, for purposes of simplicity of explanation, the methodologies included herein may be in the form of a functional diagram, operational sequence, or flow diagram, and may be described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology can alternatively be represented as a series of interrelated states or events, such as in a state diagram. Moreover, not all acts illustrated in a methodology may be required for a novel implementation.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A viscous food product dispensing system comprising:
   a transport section having a chute inlet configured to receive a particulate food product;
   an auger for processing and conveying the received particulate food product from the transport section into an outlet adapter, the auger being mechanically driven by an electric motor;
   the outlet adapter comprising:
   a milling device configured to further process the particulate food product into a pressurized flow of viscous food product that is discharged from the milling device through a nozzle, wherein the milling device is mechanically driven by the electric motor;
   wherein the nozzle further comprises a valve including an opening at a proximal end thereof configured to receive the viscous food product from the milling device wherein the valve includes a pair of opposing flap walls joined by a pair of opposing side walls, the flap walls and side walls together forming a downwardly-tapered interior passage away from the opening at the proximal end thereof.

2. The system of claim 1, wherein the valve further comprises:
   a sheath portion located on the side walls and on an upper portion of the flap walls; and
   a flexible portion defining an outlet at an end of the downwardly-tapered interior passage opposite the opening.

3. The system of claim 2, wherein the outlet is configured to flex to an open position under force from the pressurized flow of viscous food product through the interior passage, the outlet in the open position having a shape of an elongated slit having a bulbous middle portion, and the outlet being configured to return to a closed position upon a reduction of the pressurized flow of viscous food product through the interior middle portion.

4. The system of claim 2, wherein the outlet is configured to flex to an open position under force from the pressurized flow of viscous food product as it flows through the interior passage, and the outlet is configured to return to a closed position upon a reduction of the pressurized flow of viscous food product.

5. The system of claim 4 wherein the opening is ovoid and the interior passage tapers asymmetrically in two dimensions from the opening downstream towards the outlet.

6. The system of claim 1, wherein the milling device further comprises an opposing set of grinding members.

7. The system of claim 6, wherein the opposing set of grinding members comprises a fixed grinder plate and a rotating grinder plate configured to rotate relative to the fixed grinder plate.

8. The system of claim 7, wherein a portion of the auger extends through the fixed grinder plate and the auger is secured to the rotating grinder to rotate the rotating grinder plate with the electric motor.

9. The system of claim 8, wherein the portion of the auger and the fixed grinder plate are positioned within a front housing, and a position of the fixed grinder plate is adjustable within the front housing along the auger relative to the rotating grinder plate.

10. The system of claim 9, further comprising at least one adjustment screw that extends through the front housing to engage the fixed grinder plate to secure the position of the fixed grinder plate within the front housing.

11. The system of claim 10, wherein the front housing comprises at least one slot angled in a direction from a rear of the system towards a front of the system.

12. The system of claim 8, wherein a position of the fixed grinder plate relative to the rotating grinder plate is adjustable to control a texture of the viscous food product.

13. The system of claim 12, further comprising:
   a front housing surrounding at least a portion of the fixed grinder plate; and
   at least one adjustment screw that extends through at least one slot through the front housing to engage the fixed grinder plate to secure the position of the fixed grinder plate within the front housing relative to the rotating grinder plate.

14. The system of claim 8, further comprising a discharge cover that encloses at least a portion of the milling device, wherein the nozzle extends from the discharge cover in a direction away from the milling device.

15. The system of claim 14, further comprising a front housing that encloses at least another portion of the milling device and the discharge cover is secured to the front housing to enclose the milling device.

16. A viscous food product dispensing system comprising:
a transport section having a chute inlet configured to receive a particulate food product;
an auger for processing and conveying the received particulate food product from the transport section into an outlet adapter, the auger being mechanically driven by an electric motor;
the outlet adapter comprising:
   a milling device mechanically driven by the electric motor and configured to further process the particulate food product into a pressurized flow of viscous food paste, the milling device comprising a fixed grinder plate and a rotating grinder plate, wherein a portion of the auger extends through the fixed grinder plate and the auger is secured to the rotating grinder plate to rotate the rotating grinder plate with the electric motor; and
   a nozzle configured to discharge the pressurized flow of viscous food paste, the nozzle comprising a valve with an opening at a proximal end thereof configured to receive the viscous food paste from the milling device wherein the valve includes a pair of opposing flap walls joined by a pair of opposing side walls, the flap walls and side walls together forming a downwardly-tapered interior passage away from the opening towards an outlet, the outlet configured to flex to an open position under force from the pressurized flow of viscous food paste through the interior passage and configured to return to a closed position upon a reduction of the pressurized flow of viscous food paste through the interior middle portion.

17. The system of claim 16, wherein the portion of the auger and the fixed grinder plate are positioned within a front housing, and the fixed grinder plate is adapted to adjust a position of the fixed grinder plate within the front housing along the auger relative to the rotating grinder plate and at least one adjustment screw extends through the front housing to engage the fixed grinder plate to secure the position of the fixed grinder plate within the front housing.

18. A method of dispensing a viscous food product, the method comprising:

providing a transport section having a chute inlet configured to receive a particulate food product, an auger for processing and conveying the received particulate food product from the transport section into an outlet adapter, the auger being mechanically driven by an electric motor, the outlet adapter comprising a milling device mechanically driven by the electric motor and configured to further process the particulate food product into a pressurized flow of viscous food product that is discharged from the milling device through a nozzle comprising a valve with an opening at a proximal end thereof, the valve including a pair of opposing flap walls joined by a pair of opposing side walls together forming a downwardly-tapered interior passage away from the opening towards an outlet, the method comprising:
receiving a flow of the viscous food product through the opening;
building force within the interior passage from the flow of the viscous food product;
flexing the outlet to an open position under the force of the flow of the viscous food product;
dispensing the viscous food product in an elongated stream through the outlet in the open position;
returning the outlet to a closed position when the force within the interior passage drops due to a reduction in the flow of the viscous food product; and
ending the dispense by severing the elongated stream with the outlet.

19. The method of claim 18, further comprising:
receiving the particulate food product into the chute of the transport section;
conveying the particulate food product from the transport section to the milling device;
driving a rotating grinder plate with the electric motor mechanically connected to the rotating grinder plate by the auger;
grinding the particulate food product between a fixed grinder plate and the rotating grinder plate to produce the viscous food product; and
adjusting a texture of the viscous food product by adjusting a distance of the fixed grinder plate relative to the rotating grinder plate.

* * * * *